US011051631B2

(12) United States Patent
DeMoss et al.

(10) Patent No.: US 11,051,631 B2
(45) Date of Patent: Jul. 6, 2021

(54) COIL-IN-COIL SPRINGS WITH NON-LINEAR LOADING RESPONSES AND MATTRESSES INCLUDING THE SAME

(71) Applicant: Sealy Technology, LLC, Trinity, NC (US)

(72) Inventors: Larry K. DeMoss, Greensboro, NC (US); Brian M. Manuszak, Thomasville, NC (US); Darin T. Thomas, Salisbury, NC (US)

(73) Assignee: Sealy Technology, LLC, Trinity, NC (US)

( * ) Notice: Subject to any disclaimer, the term of this patent is extended or adjusted under 35 U.S.C. 154(b) by 0 days.

(21) Appl. No.: 16/825,569

(22) Filed: Mar. 20, 2020

(65) Prior Publication Data

US 2020/0214466 A1 Jul. 9, 2020

Related U.S. Application Data

(63) Continuation of application No. 15/322,886, filed as application No. PCT/US2016/014299 on Jan. 21, 2016, now Pat. No. 10,610,029.

(51) Int. Cl.
*A47C 27/06* (2006.01)
*F16F 3/04* (2006.01)

(52) U.S. Cl.
CPC .......... *A47C 27/065* (2013.01); *A47C 27/064* (2013.01); *F16F 3/04* (2013.01)

(58) Field of Classification Search
CPC ... A47C 27/064; A47C 27/065; A47C 27/062; A47C 23/0438; A47C 27/04; A47C 23/04; F16F 3/04; F16F 1/04
See application file for complete search history.

(56) References Cited

U.S. PATENT DOCUMENTS 26,954 A    1/1860  Peck, Jr.
44,793 A   10/1864  Fuller
(Continued)

FOREIGN PATENT DOCUMENTS

AT    309725 T    12/2005
AU   2457571 A     7/1972
(Continued)

OTHER PUBLICATIONS

European Patent Office, Communication for Application No. 16886720.8 dated Apr. 1, 2019.
(Continued)

*Primary Examiner* — Bradley T King
*Assistant Examiner* — Mahbubur Rashid
(74) *Attorney, Agent, or Firm* — Middleton Reutlinger

(57) ABSTRACT

A coil-in-coil spring is provided that exhibits a variable and non-linear loading response upon compression. The spring comprises a continuous wire including a first spring portion having a first spring constant, a second spring portion having a second spring constant less than the first spring constant, and a third spring portion having a third spring constant less than the first spring constant and less than the second spring constant. In the coil-in-coil spring, the first spring portion forms an outer coil of the coil-in-coil spring and the second spring portion, the third spring portion, or both the second spring portion and the third spring portion are positioned within the first spring portion and form an inner coil of the coil-in-coil spring. A multi-coil spring is also provided that includes an outer coil, an intermediate coil positioned within the outer coil, and an inner coil positioned with the intermediate coil.

14 Claims, 6 Drawing Sheets

(56) References Cited

U.S. PATENT DOCUMENTS

| | | | |
|---|---|---|---|
| 85,938 A | 1/1869 | Kirkpatrick | |
| 140,975 A | 7/1873 | Van Wert et al. | |
| 184,703 A | 11/1876 | Camp | |
| 274,715 A | 3/1883 | Buckley | |
| 380,651 A | 4/1888 | Fowler et al. | |
| 399,867 A | 3/1889 | Gail et al. | |
| 409,024 A | 5/1889 | Wagner et al. | |
| 485,652 A | 11/1892 | Pfingst | |
| 516,360 A | 3/1894 | Turton | F16F 1/08 267/166.1 |
| 569,256 A | 10/1896 | Van Cise | |
| D28,896 S | 6/1898 | Comstock | |
| 653,155 A | 7/1900 | Tilden | F16F 1/046 5/256 |
| 804,352 A | 11/1905 | Van Cise | |
| 859,409 A | 7/1907 | Radarmacher | |
| 1,025,489 A | 5/1912 | Thompson | |
| 1,211,267 A | 1/1917 | Young | |
| 1,250,892 A | 12/1917 | Johnson | |
| 1,253,414 A | 1/1918 | D'Arcy | |
| 1,284,384 A | 11/1918 | Lewis | |
| 1,337,320 A | 4/1920 | Karr | |
| 1,344,636 A | 6/1920 | Jackson | |
| 1,744,389 A | 1/1930 | Karr | |
| 1,745,892 A | 2/1930 | Edwards | |
| 1,745,986 A | 2/1930 | Edwards | |
| 1,751,261 A | 3/1930 | Wilson | |
| 1,798,885 A | 3/1931 | Karr | |
| 1,804,821 A | 5/1931 | Stackhouse | |
| 1,839,325 A | 1/1932 | Marquardt | |
| 1,879,172 A | 9/1932 | Gail | |
| 1,907,324 A | 5/1933 | Kirchner | |
| 1,938,489 A | 12/1933 | Karr | |
| 1,950,770 A | 3/1934 | Bayer | |
| 1,963,053 A | 6/1934 | Powers | A47C 23/0438 5/256 |
| 1,989,302 A | 1/1935 | Wilmot | |
| 2,054,868 A | 9/1936 | Schwartzman | |
| D109,730 S | 5/1938 | Powers | |
| 2,148,961 A | 2/1939 | Pleet | |
| 2,214,135 A | 9/1940 | Hickman | |
| 2,348,897 A | 5/1944 | Gladstone | |
| 2,403,043 A | 7/1946 | Bowersox | |
| 2,480,158 A | 8/1949 | Owen | |
| 2,562,099 A | 7/1951 | Hilton | |
| 2,614,681 A | 10/1951 | Keil | |
| 2,577,812 A | 12/1951 | Samel | |
| 2,611,910 A | 9/1952 | Bell | |
| 2,617,124 A | 11/1952 | Johnson | |
| 2,681,457 A | 6/1954 | Rymland | |
| 2,724,842 A | 11/1955 | Rogovy | A47C 27/061 5/248 |
| 2,866,433 A | 12/1958 | Kallick et al. | |
| 2,889,562 A | 6/1959 | Gleason | |
| 2,972,154 A | 2/1961 | Raszinski | |
| 3,076,203 A | 2/1963 | Verreau | A47C 27/065 5/256 |
| 3,083,381 A | 4/1963 | Bailey | |
| 3,089,154 A | 5/1963 | Boyles | |
| 3,107,367 A | 10/1963 | Nachman | |
| 3,173,159 A | 3/1965 | Hart | |
| 3,256,535 A | 6/1966 | Anson | |
| 3,430,275 A | 3/1969 | Janapol | |
| 3,517,398 A | 6/1970 | Patton | |
| 3,533,114 A | 10/1970 | Karpen | |
| 3,538,521 A | 11/1970 | Basner | |
| 3,541,827 A | 11/1970 | Hansen | |
| 3,653,081 A | 4/1972 | Davis | |
| 3,653,082 A | 4/1972 | Davis | |
| 3,690,456 A | 9/1972 | Powers, Jr. | |
| 3,633,228 A | 11/1972 | Zysman | |
| 3,708,809 A | 1/1973 | Basner | |
| 3,735,431 A | 5/1973 | Zocco | |
| 3,751,025 A | 8/1973 | Beery et al. | |
| D230,683 S | 3/1974 | Roe | |
| 3,869,739 A | 3/1975 | Klein | |
| 3,016,464 A | 11/1975 | Tyhanci | |
| 3,923,293 A | 12/1975 | Wiegand | |
| 3,938,653 A | 2/1976 | Senger | |
| 4,077,619 A | 3/1978 | Borlinghaus | |
| 4,092,749 A | 6/1978 | Klancnik | |
| 4,109,330 A | 8/1978 | Klancnik | |
| 4,111,407 A | 9/1978 | Stager | |
| 4,122,566 A | 10/1978 | Yates | |
| 4,155,130 A | 5/1979 | Roe | |
| 4,160,544 A | 7/1979 | Higgins | |
| 4,164,281 A | 8/1979 | Schnier | |
| 4,257,151 A | 3/1981 | Coots | |
| 4,388,738 A | 6/1983 | Wagner | |
| 4,439,977 A | 4/1984 | Stumpf | |
| 4,519,107 A | 5/1985 | Dillon et al. | |
| 4,523,344 A | 6/1985 | Stumpf | |
| 4,533,033 A | 8/1985 | van Wegen | |
| 4,535,978 A | 8/1985 | Wagner | |
| 4,548,390 A | 10/1985 | Sasaki | |
| 4,566,926 A | 1/1986 | Stumpf et al. | |
| 4,578,834 A | 4/1986 | Stumpf et al. | |
| 4,609,186 A | 9/1986 | Thoenen et al. | |
| 4,664,361 A | 5/1987 | Sasaki | |
| 4,726,572 A | 2/1988 | Flesher et al. | |
| 4,817,924 A | 4/1989 | Thoenen et al. | |
| 4,960,267 A | 10/1990 | Scott et al. | |
| 5,040,255 A | 8/1991 | Barber | |
| 5,127,509 A | 7/1992 | Kohlen | |
| 5,127,635 A | 7/1992 | Long et al. | |
| 5,222,264 A | 6/1993 | Morry | |
| 5,319,815 A | 6/1994 | Stumpf et al. | |
| 5,363,522 A | 11/1994 | McGraw | |
| 5,425,531 A | 6/1995 | Perrault | F16F 1/046 267/166.1 |
| 5,444,905 A | 8/1995 | St. Clair | |
| 5,575,460 A | 11/1996 | Knoepfel et al. | |
| 5,584,083 A | 12/1996 | Ramsey et al. | |
| 5,701,623 A | 12/1997 | May | |
| 5,713,088 A | 2/1998 | Wagner et al. | |
| 5,720,471 A | 2/1998 | Constantinescu | |
| 5,724,686 A | 3/1998 | Neal | |
| 5,787,532 A | 8/1998 | Langer et al. | |
| 5,803,440 A | 9/1998 | Wells | |
| 5,832,551 A | 11/1998 | Wagner | |
| 5,868,383 A | 2/1999 | Codos | |
| 5,878,998 A | 3/1999 | Hsieh | |
| D409,024 S | 5/1999 | Wagner et al. | |
| 6,128,798 A | 10/2000 | Barman | |
| 6,134,729 A | 10/2000 | Quintile et al. | |
| 6,149,143 A | 11/2000 | Richmond et al. | |
| 6,155,310 A | 12/2000 | Haubert et al. | |
| 6,243,900 B1 | 6/2001 | Gladney et al. | |
| 6,256,820 B1 | 7/2001 | Moser et al. | |
| 6,260,223 B1 | 7/2001 | Mossbeck et al. | |
| 6,263,533 B1 | 7/2001 | Dimitry et al. | |
| 6,272,706 B1 | 8/2001 | McCune | |
| 6,315,275 B1 | 11/2001 | Zysman | |
| 6,318,416 B1 | 11/2001 | Grueninger | |
| 6,336,305 B1 | 1/2002 | Graf et al. | |
| 6,339,857 B1 | 1/2002 | Clayton | |
| 6,354,577 B1 | 3/2002 | Quintile et al. | |
| 6,375,169 B1 | 4/2002 | McCraw et al. | |
| 6,398,199 B1 | 6/2002 | Barber | |
| 6,406,009 B1 | 6/2002 | Constantinescu et al. | |
| 6,408,469 B1 | 6/2002 | Gladney et al. | |
| 6,430,982 B2 | 8/2002 | Andrea et al. | |
| 6,467,240 B2 | 10/2002 | Zysman | |
| 6,481,701 B2 | 11/2002 | Kessen et al. | |
| 6,540,214 B2 | 4/2003 | Barber | |
| 6,640,836 B2 | 11/2003 | Haubert et al. | |
| 6,659,261 B2 | 12/2003 | Miyakawa | |
| 6,668,406 B2 | 12/2003 | Spinks | |
| 6,698,166 B2 | 3/2004 | Zysman | |
| 6,729,610 B2 | 5/2004 | Constantinescu | |
| 6,758,078 B2 | 6/2004 | Wells et al. | |
| 6,772,463 B2 | 8/2004 | Gladney et al. | |
| 6,883,196 B2 | 4/2005 | Barber | |

(56) References Cited

U.S. PATENT DOCUMENTS

| | | |
|---|---|---|
| 6,931,685 B2 | 8/2005 | Kuchel et al. |
| 6,952,850 B2 | 10/2005 | Visser et al. |
| 6,966,091 B2 | 11/2005 | Barber |
| 7,044,454 B2 | 5/2006 | Colman et al. |
| 7,048,263 B2 | 5/2006 | Ahlqvist |
| 7,063,309 B2 | 6/2006 | Colman |
| 7,086,425 B2 | 8/2006 | Widmer |
| D527,932 S | 9/2006 | Eigenmann et al. |
| D528,329 S | 9/2006 | Eigenmann et al. |
| D528,330 S | 9/2006 | Eigenmann et al. |
| D528,833 S | 9/2006 | Eigenmann et al. |
| D530,120 S | 10/2006 | Eigenmann et al. |
| D531,436 S | 11/2006 | Eigenmann et al. |
| 7,168,117 B2 | 1/2007 | Gladney et al. |
| 7,178,187 B2 | 2/2007 | Barman et al. |
| 7,185,379 B2 | 3/2007 | Barman |
| 7,219,381 B2 | 5/2007 | Damewood et al. |
| 7,287,291 B2 | 10/2007 | Carlitz |
| 7,386,897 B2 | 6/2008 | Eigenmann et al. |
| 7,404,223 B2 | 7/2008 | Manuszak et al. |
| D579,242 S | 10/2008 | Kilic |
| 7,578,016 B1 | 8/2009 | McCraw |
| 7,636,971 B2 | 12/2009 | Demoss |
| 7,748,065 B2 | 7/2010 | Edling |
| D621,186 S | 8/2010 | Demoss |
| D621,198 S | 8/2010 | Morrison |
| D622,088 S | 8/2010 | Morrison |
| 7,805,790 B2 | 10/2010 | Demoss |
| 7,814,594 B2 | 10/2010 | DeFranks et al. |
| D633,322 S | 3/2011 | Morrison |
| 7,908,693 B2 | 3/2011 | Demoss |
| 7,921,561 B2 | 4/2011 | Eigenmann et al. |
| D640,082 S | 6/2011 | Morrison |
| D649,385 S | 11/2011 | Freese et al. |
| D651,828 S | 1/2012 | DeMoss et al. |
| D652,234 S | 1/2012 | Demoss et al. |
| D652,235 S | 1/2012 | Demoss et al. |
| 8,157,084 B2 | 4/2012 | Begin et al. |
| D659,459 S | 5/2012 | Jung et al. |
| D662,751 S | 7/2012 | Morrison et al. |
| D662,752 S | 7/2012 | Morrison et al. |
| 8,230,538 B2 | 7/2012 | Moret et al. |
| D666,448 S | 9/2012 | Morrison et al. |
| D666,449 S | 9/2012 | Morrison et al. |
| 8,337,368 B2 | 12/2012 | Weller .................. A63B 5/08 482/35 |
| D696,048 S | 12/2013 | Morrison |
| D704,478 S | 5/2014 | Arnold |
| D704,965 S | 5/2014 | Arnold |
| 8,720,872 B2 | 5/2014 | DeMoss et al. |
| D708,455 S | 7/2014 | Arnold |
| 8,783,447 B1 | 7/2014 | Yohe |
| D711,160 S | 8/2014 | Arnold |
| 8,857,799 B2 | 10/2014 | Tyree |
| D717,077 S | 11/2014 | Arnold |
| D717,078 S | 11/2014 | Arnold |
| 8,895,109 B2 | 11/2014 | Cohen |
| D719,766 S | 12/2014 | Arnold |
| D720,159 S | 12/2014 | Arnold |
| 8,905,386 B2 | 12/2014 | Rasbach |
| 8,979,079 B2 | 3/2015 | DeFranks |
| 9,022,369 B2 | 5/2015 | Demoss et al. |
| 9,085,420 B2 | 7/2015 | Williams |
| D744,767 S | 12/2015 | Morrison et al. |
| D744,768 S | 12/2015 | Morrison et al. |
| 9,211,017 B2 | 12/2015 | Tyree |
| 9,352,913 B2 | 5/2016 | Manuszak et al. |
| 9,392,876 B2 | 7/2016 | Tyree |
| D763,013 S | 8/2016 | Arnold |
| D776,958 S | 1/2017 | Arnold |
| D776,959 S | 1/2017 | Arnold |
| 9,936,815 B2 | 4/2018 | DeMoss et al. |
| 10,051,973 B2 | 8/2018 | Morgan et al. |
| 10,598,242 B2 | 3/2020 | Thomas et al. |
| 10,610,029 B2 | 4/2020 | DeMoss et al. |
| 2001/0008030 A1 | 7/2001 | Gladney et al. |
| 2001/0013147 A1 | 8/2001 | Fogel |
| 2002/0139645 A1 | 10/2002 | Haubert et al. |
| 2002/0152554 A1 | 10/2002 | Spinks et al. |
| 2003/0093864 A1 | 5/2003 | Visser et al. |
| 2003/0177585 A1 | 9/2003 | Gladney et al. |
| 2004/0046297 A1 | 3/2004 | Demoss et al. |
| 2004/0074005 A1 | 4/2004 | Kuchel |
| 2004/0079780 A1 | 4/2004 | Kato |
| 2004/0133988 A1 | 7/2004 | Barber |
| 2004/0237204 A1 | 12/2004 | Antinori |
| 2004/0261187 A1 | 12/2004 | Van Patten |
| 2005/0005354 A1 | 1/2005 | Gladney et al. |
| 2005/0246839 A1 | 11/2005 | Noswonger |
| 2006/0042016 A1 | 3/2006 | Barman et al. |
| 2007/0017033 A1 | 1/2007 | Antinori |
| 2007/0017035 A1 | 1/2007 | Chen et al. |
| 2007/0094807 A1 | 5/2007 | Wells |
| 2007/0124865 A1 | 6/2007 | Stjerna |
| 2007/0169275 A1 | 7/2007 | Manuszak et al. |
| 2007/0220680 A1 | 9/2007 | Miller et al. |
| 2007/0220681 A1 | 9/2007 | Gladney et al. |
| 2007/0289068 A1 | 12/2007 | Edling |
| 2008/0017255 A1 | 1/2008 | Petersen |
| 2008/0017271 A1 | 1/2008 | Haltiner |
| 2008/0115287 A1 | 5/2008 | Eigenmann et al. |
| 2009/0193591 A1 | 8/2009 | DeMoss et al. |
| 2010/0180385 A1 | 7/2010 | Petrolati et al. |
| 2010/0212090 A1 | 8/2010 | Stjerna |
| 2010/0257675 A1 | 10/2010 | Demoss |
| 2011/0094039 A1 | 4/2011 | Tervo et al. |
| 2011/0099722 A1 | 5/2011 | Moret et al. |
| 2011/0107523 A1 | 5/2011 | Moret et al. |
| 2011/0148018 A1 | 6/2011 | DeFranks et al. |
| 2011/0227353 A1 | 9/2011 | Nagwanshi |
| 2012/0042454 A1 | 2/2012 | Viberg |
| 2012/0047658 A1 | 3/2012 | Demoss et al. |
| 2012/0112396 A1 | 5/2012 | DeFranks ................ F16F 1/04 267/180 |
| 2012/0159715 A1 | 6/2012 | Jung et al. |
| 2012/0180224 A1 | 7/2012 | Demoss et al. |
| 2013/0026688 A1 | 1/2013 | McCarthy ................ F16F 3/06 267/138 |
| 2013/0031726 A1 | 2/2013 | Demoss |
| 2013/0081207 A1 | 4/2013 | Cohen |
| 2014/0033441 A1 | 2/2014 | Morgan et al. |
| 2014/0250602 A1 | 9/2014 | Spinks |
| 2014/0373280 A1 | 12/2014 | Mossbeck et al. |
| 2015/0068568 A1 | 3/2015 | Wu |
| 2015/0084251 A1 | 3/2015 | Ahn ........................ F16F 1/047 267/180 |
| 2015/0342362 A1 | 12/2015 | Demoss et al. |
| 2015/0374136 A1 | 12/2015 | Mikkelsen et al. |
| 2016/0029809 A1 | 2/2016 | Shive |
| 2016/0037938 A1 | 2/2016 | Tyree |
| 2016/0255964 A1 | 9/2016 | Thomas |
| 2016/0316927 A1 | 11/2016 | Thomas et al. |
| 2018/0055240 A1 | 3/2018 | Demoss et al. |
| 2018/0168360 A1 | 6/2018 | Thomas et al. |
| 2018/0368585 A1 | 12/2018 | Demoss et al. |
| 2019/0000239 A1 | 1/2019 | Thomas et al. |
| 2019/0343294 A1 | 11/2019 | Demoss et al. |
| 2020/0018370 A1 | 1/2020 | Demoss et al. |

FOREIGN PATENT DOCUMENTS

| | | |
|---|---|---|
| AU | 2964877 A | 4/1979 |
| AU | 4825179 A | 1/1980 |
| AU | 515761 B2 | 4/1981 |
| AU | 3437584 | 4/1985 |
| AU | 7297987 A | 11/1987 |
| AU | 4609889 | 4/1990 |
| AU | 9005391 A | 2/1992 |
| AU | 4662597 | 4/1998 |
| AU | 6975298 A | 11/1998 |
| AU | 4994901 A | 12/2001 |
| AU | 7367201 A | 1/2002 |
| AU | 2001297805 | 4/2003 |
| AU | 2003205072 A1 | 9/2003 |

(56) References Cited

FOREIGN PATENT DOCUMENTS

| | | |
|---|---|---|
| AU | 2003268425 A1 | 4/2004 |
| AU | 2004283189 A1 | 5/2005 |
| AU | 2005280479 A1 | 3/2006 |
| AU | 2001249949 B2 | 11/2006 |
| AU | 2008219052 | 8/2008 |
| AU | 2009206026 A1 | 7/2009 |
| AU | 2009212687 A1 | 8/2009 |
| AU | 2010202712 A1 | 7/2010 |
| AU | 2009342701 A1 | 10/2010 |
| AU | 2010236454 A1 | 10/2011 |
| AU | 2011338830 A1 | 7/2013 |
| AU | 2012204359 A1 | 7/2013 |
| AU | 2014236431 A1 | 10/2015 |
| AU | 2012207475 B2 | 10/2016 |
| AU | 2015396842 A1 | 12/2017 |
| BR | PI0112471 A | 8/2003 |
| BR | 0115070-7 | 1/2004 |
| BR | PI0111389 A | 2/2004 |
| BR | PI0306959 A | 11/2004 |
| BR | PI0313096 A | 7/2005 |
| BR | PI0415440 A | 12/2006 |
| BR | PI0514799 A | 6/2008 |
| BR | PI0906744 A2 | 7/2015 |
| BR | PI1014650 A2 | 4/2016 |
| BR | PI0908426 A2 | 5/2016 |
| BR | PI1314067 A2 | 9/2016 |
| BR | PI1317409 A2 | 10/2016 |
| BR | PI1318278 A2 | 11/2016 |
| BR | PI1318279 A2 | 11/2016 |
| CA | 721181 A | 11/1965 |
| CA | 730050 A | 3/1966 |
| CA | 730051 A | 3/1966 |
| CA | 935574 A1 | 10/1973 |
| CA | 938740 A1 | 12/1973 |
| CA | 1052916 A1 | 4/1979 |
| CA | 1127324 A1 | 7/1982 |
| CA | 1179074 A1 | 12/1984 |
| CA | 1290472 C | 10/1991 |
| CA | 2411702 A1 | 12/2001 |
| CA | 2415904 A1 | 1/2002 |
| CA | 2430330 | 4/2003 |
| CA | 2471977 A1 | 7/2003 |
| CA | 2495780 A1 | 3/2004 |
| CA | 2539008 A1 | 5/2005 |
| CA | 2578144 A1 | 3/2006 |
| CA | 2678855 A1 | 8/2008 |
| CA | 2712457 | 1/2009 |
| CA | 2714397 A1 | 8/2009 |
| CA | 2758906 A1 | 10/2010 |
| CA | 2708212 A1 | 2/2011 |
| CA | 140155 S | 12/2011 |
| CA | 140156 S | 12/2011 |
| CA | 2820219 A1 | 6/2012 |
| CA | 2823387 A1 | 7/2012 |
| CA | 2824985 A1 | 7/2012 |
| CA | 2825044 A1 | 7/2012 |
| CA | 2906122 A1 | 9/2014 |
| CA | 2988071 A1 | 12/2016 |
| CA | 2820219 C | 10/2017 |
| CA | 172824 S | 11/2017 |
| CA | 172825 S | 11/2017 |
| CA | 172826 S | 11/2017 |
| CA | 172827 S | 11/2017 |
| CA | 172828 S | 11/2017 |
| CA | 172829 S | 11/2017 |
| CA | 172830 S | 11/2017 |
| CA | 176681 S | 11/2017 |
| CA | 176683 S | 11/2017 |
| CA | 176684 S | 11/2017 |
| CA | 176685 S | 11/2017 |
| CA | 176686 S | 11/2017 |
| CA | 176705 S | 11/2017 |
| CA | 176706 S | 11/2017 |
| CH | 406554 A | 1/1966 |
| CN | 1431879 A | 7/2003 |
| CN | 1682040 | 10/2005 |
| CN | 1682040 A | 10/2005 |
| CN | 1230267 | 12/2005 |
| CN | 1964650 A | 5/2007 |
| CN | 101052331 A | 10/2007 |
| CN | 101140019 A | 3/2008 |
| CN | 101977535 A | 2/2011 |
| CN | 101990413 A | 3/2011 |
| CN | 301837054 S | 2/2012 |
| CN | 102395302 A | 3/2012 |
| CN | 302060365 S | 9/2012 |
| CN | 302078253 S | 9/2012 |
| CN | 302078254 S | 9/2012 |
| CN | 103313629 A | 9/2013 |
| CN | 103313630 A | 9/2013 |
| CN | 103327850 A | 9/2013 |
| CN | 103327851 A | 9/2013 |
| CN | 105377082 A | 3/2016 |
| CN | 103313629 B | 8/2016 |
| DE | 2113901 A1 | 2/1972 |
| DE | 2927262 A1 | 1/1980 |
| DE | 69734681 D1 | 12/2005 |
| DK | 2418985 T3 | 6/2016 |
| DK | 2967222 T3 | 3/2018 |
| EM | 001620725-0001 | 10/2009 |
| EP | 156883 A1 | 10/1985 |
| EP | 269681 A1 | 6/1988 |
| EP | 1018911 A1 | 7/2000 |
| EP | 1286611 A1 | 3/2003 |
| EP | 1327087 A1 | 7/2003 |
| EP | 1337357 | 8/2003 |
| EP | 1537045 A2 | 6/2005 |
| EP | 1682320 A2 | 7/2006 |
| EP | 1784099 | 5/2007 |
| EP | 2112896 | 11/2009 |
| EP | 2112896 A2 | 11/2009 |
| EP | 2244607 A1 | 11/2010 |
| EP | 2296509 A1 | 3/2011 |
| EP | 2418985 A1 | 2/2012 |
| EP | 2648573 A1 | 10/2013 |
| EP | 2661196 A1 | 11/2013 |
| EP | 2665391 A1 | 11/2013 |
| EP | 2665392 A1 | 11/2013 |
| EP | 2946696 A1 | 11/2015 |
| EP | 2954801 A1 | 12/2015 |
| EP | 2967222 A1 | 1/2016 |
| EP | 3302179 A1 | 4/2018 |
| EP | 3389450 A1 | 10/2018 |
| EP | 3405073 A1 | 11/2018 |
| EP | 3554315 A1 | 10/2019 |
| EP | 3562351 A1 | 11/2019 |
| ES | 482352 A1 | 4/1980 |
| ES | 252961 U | 2/1981 |
| ES | 2249804 T3 | 4/2006 |
| ES | 2575555 T3 | 6/2016 |
| ES | 2660293 T3 | 3/2018 |
| FR | 2430743 A | 2/1980 |
| FR | 2780624 A1 | 1/2000 |
| GB | 494428 | 10/1938 |
| GB | 976021 A | 11/1964 |
| GB | 1284690 A | 8/1972 |
| GB | 2025217 A | 1/1980 |
| GB | 1577584 A | 10/1980 |
| GB | 2215199 A | 9/1989 |
| IN | 1686DELNP2007 | 8/2007 |
| IN | 7883DELNP2011 | 9/2013 |
| IN | 5595DELNP2013 | 12/2014 |
| IN | 5701DELNP2013 | 12/2014 |
| IN | 6306DELNP2013 | 12/2014 |
| IN | 6307DELNP2013 | 12/2014 |
| IN | 201717043686 | 1/2018 |
| JP | 53085668 A | 7/1978 |
| JP | 55014095 A | 1/1980 |
| JP | 56039328 A | 4/1981 ................ F16F 3/04 |
| JP | 60081528 A | 5/1985 |
| JP | 63035206 A | 2/1988 |
| JP | 01004763 B | 1/1989 |
| JP | 4084750 | 4/2008 |
| JP | 2010-527795 A | 8/2010 |

(56) References Cited

FOREIGN PATENT DOCUMENTS

| | | |
|---|---|---|
| JP | 2015051285 A | 3/2015 |
| JP | 5710124 | 4/2015 |
| KR | 19830002865 A | 5/1983 |
| KR | 19830002865 B1 | 12/1983 |
| KR | 100355167 B1 | 9/2002 |
| KR | 1020070026321 A | 3/2007 |
| KR | 10-0730278 | 6/2007 |
| KR | 100730278 B1 | 6/2007 |
| KR | 100735773 B1 | 6/2007 |
| KR | 1020070057164 A | 6/2007 |
| KR | 1020090122230 A | 11/2009 |
| KR | 1020120024585 A | 3/2012 |
| KR | 1020120030303 A | 3/2012 |
| KR | 1020130140089 A | 12/2013 |
| KR | 1020140006899 A | 1/2014 |
| KR | 1020140031187 A | 3/2014 |
| KR | 1020140032995 A | 3/2014 |
| KR | 101559748 B1 | 10/2015 |
| KR | 1020170081298 A | 7/2017 |
| KR | 101970351 B1 | 4/2019 |
| KR | 102070175 B1 | 1/2020 |
| KR | 102090031 B1 | 3/2020 |
| MX | 150175 A | 3/1984 |
| MX | PA02011719 A | 5/2003 |
| MX | PA03004813 | 3/2004 |
| MX | PA03000300 A | 12/2004 |
| MX | PA04006971 A | 12/2004 |
| MX | PA05002627 A | 9/2005 |
| MX | PA06004139 A | 6/2006 |
| MX | 2007002292 A | 10/2007 |
| MX | 2009008861 A | 11/2009 |
| MX | 2010007835 A | 9/2010 |
| MX | 2010008675 A | 10/2010 |
| MX | 2011010876 A | 11/2011 |
| MX | 2010007836 A | 9/2012 |
| MX | 2013006310 A | 7/2013 |
| MX | 2013007934 A | 8/2013 |
| MX | 314236 | 10/2013 |
| MX | 2013008403 A | 10/2013 |
| MX | 2013008404 A | 10/2013 |
| MX | 2015012909 A | 12/2015 |
| NZ | 525792 | 11/2004 |
| NZ | 579217 | 5/2011 |
| NZ | 587211 | 10/2012 |
| SG | 98527 | 7/2005 |
| TW | 512085 | 12/2002 |
| TW | 559554 A | 11/2003 |
| TW | 200611658 A | 4/2006 |
| TW | 201230986 A | 8/2012 |
| WO | 8501424 A1 | 4/1985 |
| WO | 8706987 A1 | 11/1987 |
| WO | 0193726 A1 | 12/2001 |
| WO | 0204838 A1 | 1/2002 |
| WO | 0204838 A9 | 2/2003 |
| WO | 03061932 A2 | 7/2003 |
| WO | 2004024617 A2 | 3/2004 |
| WO | 2005039849 A2 | 5/2005 |
| WO | 2006026062 A2 | 3/2006 |
| WO | 2008103332 A2 | 8/2008 |
| WO | 2008143595 | 11/2008 |
| WO | 2009091945 A1 | 7/2009 |
| WO | 2009099993 A1 | 8/2009 |
| WO | 2010117352 A1 | 10/2010 |
| WO | 2010120886 A1 | 10/2010 |
| WO | 2012027663 A1 | 3/2012 |
| WO | 2012078398 A1 | 6/2012 |
| WO | 2012088224 A1 | 6/2012 |
| WO | 2012094468 A1 | 7/2012 |
| WO | 2012097120 A2 | 7/2012 |
| WO | 2012099812 A1 | 7/2012 |
| WO | 2012099936 A1 | 7/2012 |
| WO | 2012155131 A1 | 11/2012 |
| WO | 2012097120 A3 | 6/2014 |
| WO | 2014152935 A1 | 9/2014 |
| WO | 2014152953 A1 | 9/2014 |
| WO | 2016122453 A1 | 8/2016 |
| WO | 2016195700 A1 | 12/2016 |
| WO | 2017105454 A1 | 6/2017 |
| WO | 2017116405 | 7/2017 |
| WO | 2017116405 A1 | 7/2017 |
| WO | 2017116406 | 7/2017 |
| WO | 2017116406 A1 | 7/2017 |
| WO | 2017127082 A1 | 7/2017 |
| WO | 20170127082 | 7/2017 |
| WO | 2017200839 A2 | 11/2017 |
| WO | 2018112341 A1 | 6/2018 |
| WO | 2018118035 | 6/2018 |
| WO | 2018118035 A1 | 6/2018 |
| WO | 2018118037 | 6/2018 |
| WO | 2018118037 A1 | 6/2018 |
| WO | 2018200679 A1 | 11/2018 |
| WO | 2019089429 A1 | 5/2019 |
| ZA | 2003/03457 | 5/2004 |
| ZA | 2005/01090 | 10/2006 |

OTHER PUBLICATIONS

International Searching Authority, International Search Report; Written Opinion, dated Oct. 5, 2016; 16 pages.
The International Bureau of WIPO, International Preliminary Report on Patentability dated Jul. 24, 2018, 13 pages.
U.S. Appl. No. 62/434,668, filed Jul. 4, 2019, Demoss et al.
Extended European Search Report; European Patent Office; dated Mar. 15, 2021, 9 pgs.

COIL-IN-COIL SPRINGS WITH NON-LINEAR LOADING RESPONSES AND MATTRESSES INCLUDING THE SAME

CLAIM TO PRIORITY

This continuation patent application claims priority to and benefit, under 35 U.S.C. § 120, of U.S. 371 National Stage Non-Provisional patent application Ser. No. 15/322,886, titled "Coil-In-Coil Springs With Non-Linear Loading Responses and Mattresses Including the Same", filed Dec. 29, 2016, which is a national stage entry of PCT Application Number PCT/US2016/014299, filed Jan. 21, 2016, all of which is incorporated by reference herein.

TECHNICAL FIELD

The present invention relates to coil-in-coil springs and mattresses including coil-in-coil springs. In particular, the present invention relates to coil-in-coil springs that are comprised of a continuous wire and that exhibit a variable and non-linear loading response when compressed.

BACKGROUND

Typically, when a uniaxial load is applied to a spring, the spring exhibits a linear compression rate. That is to say, it takes twice as much force to compress a typical spring two inches as it does to compress the same spring one inch. The linear response of springs is expressed by Hooke's law, which states that the force (F) needed to extend or compress a spring by some distance (D) is proportional to that distance. This relationship is expressed mathematically as F=kD, where k represents the spring constant for a particular spring. A high spring constant indicates that the spring requires more force to compress, and a low spring constant means the spring requires less force to compress.

Linear response springs, such as wire coil springs, are commonly used as mattress innersprings in combination with padding and upholstery that surround the innersprings. Most mattress innersprings are comprised of an array of wire coil springs which are often adjoined by lacing end convolutions of the coil springs together with cross wires. An advantage of this arrangement is that it is inexpensive to manufacture. However, this type of innerspring often provides a firm and rigid mattress surface.

An alternative to an innerspring mattress is a mattress constructed of one or more foam layers. Unlike an innerspring mattress comprised of an array of wire coil springs, these foam layers exhibit a non-linear response to forces applied to the mattress. In particular, a foam mattress provides more support as the load increases. For instance, a typical foam mattress provides increased support after it has been compressed approximately 60% of the maximum compression of the foam. That non-linear response of foam mattresses is typically regarded as providing improved sleep comfort for a user. However, the mechanical properties of certain foam may degrade over time, which, in turn, affects the overall comfort of the foam mattress. Furthermore, foam mattresses are often more costly to produce than metal spring mattresses.

SUMMARY

The present invention includes coil-in-coil springs and mattresses including coil-in-coil springs. In particular, the present invention includes coil-in-coil springs that are comprised of a continuous wire and that exhibit a variable and non-linear loading response when compressed. Thus, the coil-in-coil springs of the present invention provide a user with the non-linear support typically seen in a foam mattress, but through the use of coil-in-coil springs.

In one exemplary embodiment of the present invention, a coil-in-coil spring is provided that is comprised of a continuous wire forming an outer coil and an inner coil, which is positioned within the outer coil. The continuous wire further forms a first spring portion having a first spring constant, a second spring portion having a second spring constant less than the first spring constant, and a third spring portion having a third spring constant less than the first spring constant and less than the second spring constant. Specifically, in some embodiments of the present invention, the third spring portion is positioned above the first spring portion such that the first spring portion and the third spring portion collectively form the outer coil of the coil-in-coil spring, and the second spring portion is positioned within the first spring portion such that the second spring portion forms the inner coil of the coil-in-coil spring. In other embodiments of the present invention, the second spring portion and the third spring portion are both positioned within the first spring portion such that the second spring portion and the third spring portion collectively form the inner coil of the coil-in-coil spring and the first spring portion forms the outer coil of the coil-in-coil spring. In either event, the coil-in-coil spring is configured such that that the outer coil has an uncompressed height which is greater than the uncompressed height of the inner coil.

By forming the continuous wire of an exemplary coil-in-coil spring of the present invention in a manner where the individual spring constants of the first spring portion, the second spring portion, and the third spring portion are variably combined as the coil-in-coil spring compresses, a first overall spring constant of the coil-in-coil spring provides a soft feel as the spring is initially compressed, a second overall spring constant of the coil-in-coil spring provides an intermediate feel as compression of the coil-in-coil spring increases, and a third overall spring constant of the coil-in-coil spring provides a firmer feel as compression of the coil-in-coil spring increases further.

In operation, the outer coil and the inner coil of the exemplary coil-in-coil springs function substantially as two helical springs in parallel. However, because the uncompressed height of the outer coil is greater than the uncompressed height of the inner coil, when a force is first applied to the coil-in-coil spring, only the outer coil begins to compress. Once the coil-in-coil spring is compressed to the point where the compressed height of the outer coil is equal to the uncompressed height of the inner coil, the inner coil is then engaged and the coil-in-coil spring compresses according to the combined spring constant of the outer coil and the inner coil. Furthermore, because the third spring constant of the third spring portion is less than the first spring constant of the first spring portion and also less than the second spring constant of the second spring portion, at some predetermined compression distance the third spring portion becomes fully compressed and deactivated while the first spring portion and the second spring portion continue to compress. In other words, each exemplary coil-in-coil spring initially compresses according to a first overall spring constant that is based on the spring constant of the outer coil. After further compression, the inner coil is engaged such that all spring portions are simultaneously engaged and contribute to a second overall spring constant of the coil-in-coil spring. Further compression then eventually results in the third spring portion becoming deactivated such that a third overall spring constant of the coil-in-coil spring is based on the first spring constant of the first spring portion and the second spring constant of the second spring portion.

As a further refinement to the present invention, additional intermediate coils can also be positioned between the inner coil and the outer coil. For instance, in another exemplary embodiment of the present invention, a multi-coil spring is provided that is comprised of a continuous wire forming an outer coil having an uncompressed height, an intermediate coil positioned within the outer coil and having an uncompressed height less than the uncompressed height of the outer coil, and an inner coil positioned within the intermediate coil and having an uncompressed height less than the uncompressed height of the intermediate coil. As such, in operation, the outer coil, the intermediate coil, and the inner coil function substantially as three helical springs in parallel. When a force is first applied to the multi-coil spring, only the outer coil is engaged and compresses so that a first overall spring constant of the multi-coil spring is based only on the spring constant of the outer coil. Upon further compression, the intermediate coil is then engaged and begins to compress along with the outer coil so that a second overall spring constant of the multi-coil spring is based on the spring constant of the outer coil and the spring constant of the intermediate coil. Upon further compression, the inner coil is subsequently engaged and begins to compress along with the outer coil and the intermediate coil so that a third overall spring constant of the multi-coil spring is based on the spring constant of the outer coil, the spring constant of the intermediate coil, and the spring constant of the inner coil.

Regardless of the particular configuration of the exemplary coil-in-coil springs of the present invention, in some embodiments, each of the coil-in-coil springs, can further be included in a mattress to provide a user with the non-linear support typically seen in a foam mattress, but through the use of coil springs. For example, in some embodiments of the present invention, a mattress is provided that includes a plurality of the coil-in-coil springs described herein above arranged in a matrix. Such a mattress can also comprise an upper body supporting layer, a lower foundation layer, and a sidewall extending between the upper body supporting layer and the lower foundation layer and extending around the entire periphery of the two layers, such that the matrix of coil-in-coil springs is completely surrounded.

Further features and advantages of the present invention will become evident to those of ordinary skill in the art after a study of the description, figures, and non-limiting examples in this document.

DESCRIPTION OF EXEMPLARY EMBODIMENTS

The present invention includes coil-in-coil springs and mattresses including coil-in-coil springs. In particular, the present invention includes coil-in-coil springs that are comprised of a continuous wire and that exhibit a variable and non-linear loading response when compressed. Thus, the coil-in-coil springs of the present invention provide a user with the non-linear support typically seen in a foam mattress, but through the use of coil-in-coil springs.

Figure 1:
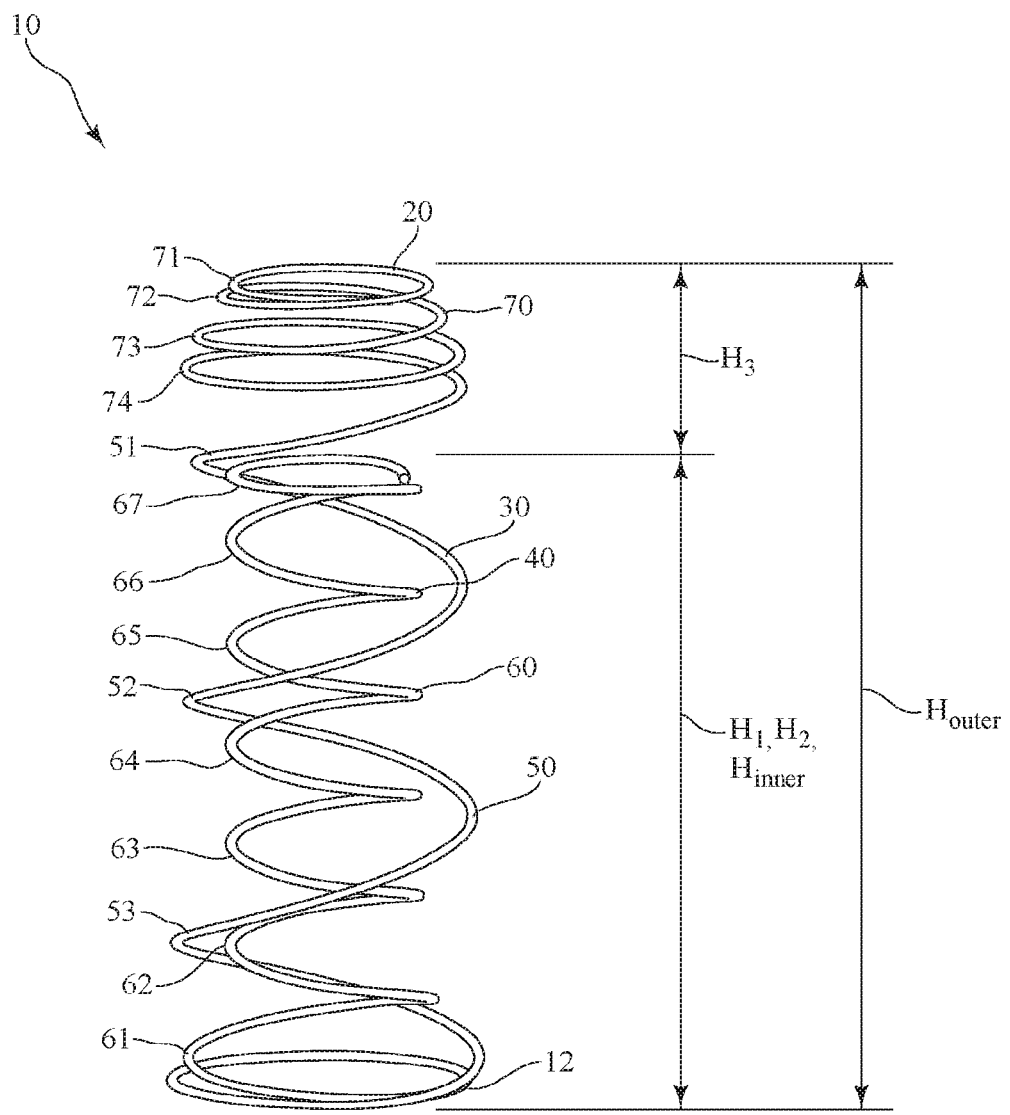
FIG. 1 is a side view of an exemplary coil-in-coil spring made in accordance with the present invention.

Referring first to FIG. 1, in one exemplary embodiment of the present invention, a coil-in-coil spring 10 is provided that is comprised of a continuous wire 20 forming an outer coil 30 and an inner coil 40 positioned within the outer coil 30. Moreover, the continuous wire 20 forms a first spring portion 50, a second spring portion 60, and a third spring portion 70, which collectively form the outer coil 30 and the inner coil 40. Specifically, in the coil-in-coil spring 10 shown in FIG. 1, the third spring portion 70 is positioned above the first spring portion 50, such that the first spring portion 50 and the third spring portion 70 collectively form the outer coil 30 of the coil-in-coil spring 10. The second spring portion 60 is then positioned within the first spring portion 50, such that the second spring portion 60 forms the inner coil 40 of the coil-in-coil spring 10.

In the coil-in-coil spring 10, the first spring portion 50 has an uncompressed height $H_1$, the second spring portion 60 has an uncompressed height $H_2$, and the third spring portion has an uncompressed height $H_3$. As shown in FIG. 1, the uncompressed height $H_2$ of the second spring portion 60 is substantially equal to the uncompressed height $H_1$ of the first spring portion 50. As such, and further because the third spring portion 70 is positioned above the first spring portion 50, the outer coil 30 has an uncompressed height $H_{outer}$, which is equal to the uncompressed height $H_1$ of the first spring portion 50 plus the uncompressed height $H_3$ of the third spring portion 70, and which is greater than the uncompressed height $H_{inner}$ of the inner coil 40 (i.e., the uncompressed height $H_2$ of the second spring portion 60). More specifically, in the coil-in-coil spring 10, the uncompressed height $H_1$ of the first spring portion 50 is about 175 mm, the uncompressed height $H_2$ of the second spring portion 60 is about 175 mm, and the uncompressed height $H_3$ of the third spring portion 70 is about 42 mm to provide a total height of about 225 mm for the coil-in-coil spring 10. Furthermore, in the coil-in-coil spring 10, the first spring portion 50 has a diameter of about 82 mm, while the second spring portion 60 has a diameter of about 55 mm. Of course, while the foregoing dimensions are utilized in the exemplary coil-in-coil spring shown in FIG. 1, numerous other exemplary coil-in-coil springs having similar arrangements of spring portions, but including alternative dimensions can also be produced without departing from the spirit and scope of the present invention.

The first spring portion 50, the second spring portion 60, and the third spring portion 70 are each formed of a plurality of convolutions of the continuous wire 20 with each convolution made up of a portion of the continuous wire 20 substantially equal to about one turn of the continuous wire 20 (i.e., about 360° of the helical path of the continuous wire 20). Of note, the third spring portion 70 includes an upper end convolution 71, which forms a substantially planar loop at the topmost portion of the coil-in-coil spring 10. Similarly, a lower end 12 of the coil-in-coil spring 10 is also formed of a substantially planar loop at the lowermost portion of the coil-in-coil spring 10. In this way, the coil-in-coil spring 10 terminates at either end in a generally planar form which serve as the supporting end structures of the coil-in-coil spring 10.

With regard to the remaining convolutions of the coil-in-coil spring 10, in most coil springs formed with a helically-spiraling continuous wire, the spring constant and resultant feel of the coil spring are primarily determined by the wire gauge, the total number of convolutions in the coil spring, the size of the convolutions (coil diameter), and the pitch between the convolutions of the coil spring. In this regard, the pitch (or vertical spacing) between each convolution of a coil spring is typically controlled by the rate at which the continuous wire, which forms the coil spring, is drawn through a forming die in a coil-forming machine. Once formed, a larger pitch will typically produce a stiffer coil spring due to the increased vertical orientation of the wire, while a smaller pitch will typically produce a softer coil spring and allow for a larger number of total convolutions in the coil body. Similarly, larger diameter convolutions in a coil spring also contribute to a lower spring constant and consequentially softer coil spring. Of course, because the wire forming the coil-in-coil spring is continuous there is no clearly defined beginning point or ending point of any single convolution. Furthermore, the diameter and pitch is typically adjusted gradually between one portion of the spring to another. As such, oftentimes a single convolution of the coil spring does not, in fact, have just one single diameter or just one single pitch, but may include, for example, a beginning or end portion with a variable diameter and/or pitch that transitions to the adjacent convolution. Therefore, as used herein, the diameter and pitch of a convolution will typically refer to an average diameter and pitch, but can also, in some embodiments, be inclusive of or refer to a maximum diameter and pitch or a minimum diameter and pitch.

In the exemplary coil-in-coil springs described herein (e.g., the coil-in-coil spring 10 shown in FIG. 1), the wire diameter of the continuous wire forming an exemplary spring is generally constant along the entire length of the continuous wire, but in different embodiments can vary from about 0.072 inches to about 0.080 inches, with a preferred range from about 0.072 inches to about 0.076 inches. Furthermore, the continuous wire forming an exemplary spring typically has a tensile strength of between about 240 kpsi to about 260 kpsi, with a preferred tensile strength of about 250 kpsi. By including multiple spring portions with varying convolution diameters, pitches, or both convolution diameters and pitches in an exemplary coil-in-coil spring, however, a variable and non-linear loading response is provided where a first overall spring constant of the coil-in-coil spring provides a soft feel as the spring is initially compressed, a second overall spring constant of the coil-in-coil spring provides an intermediate feel as the compression of the coil-in-coil spring increases, and a third overall spring constant of the coil-in-coil spring provides a firmer feel as the compression of the coil-in-coil spring increases further. In other words, by forming the continuous wire of an exemplary coil-in-coil spring of the present invention in a manner where the individual spring constants of the first spring portion, the second spring portion, and the third spring portion are variably combined as the coil-in-coil spring compresses, an exemplary coil-in-coil spring can be configured to provide support similar to that observed in a foam mattress (i.e., where increased support is observed as the foam is compressed greater distances).

Referring still to FIG. 1, and with respect to the first spring portion 50, the second spring portion 60, and the third spring portion 70 of the exemplary coil-in-coil spring 10, the first spring portion 50 includes a transition convolution 51 and two helical intermediate convolutions 52, 53 extending from the transition convolution 51 to the lower end 12 of the coil-in-coil spring 10. Each of the helical intermediate convolutions 52, 53 of the first spring portion 50 has a respective diameter, which are substantially the same and are substantially equal to the diameter of the transition convolution 51 of the first spring portion 50 as well as the diameter of the lower end 12 of the coil-in-coil spring 10, such that the first spring portion 50 has a substantially cylindrical shape. The continuous wire 20 also defines a pitch between each of the plurality of helical intermediate convolutions 52, 53 of the first spring portion 50 with the pitch between each of the helical intermediate convolutions 52, 53 of the first spring portion 50 being substantially the same.

Turning now to the second spring portion 60 of the coil-in-coil spring 10, the second spring portion 60 includes an upper end convolution 67 and six helical intermediate convolutions 61, 62, 63, 64, 65, 66 that extend from the lower end 12 of the coil-in-coil spring 10 to the upper end convolution 67 of the second spring portion 60. Each of the helical intermediate convolutions 61, 62, 63, 64, 65, 66 of the second spring portion 60 has a respective diameter, which are substantially the same and are substantially equal to the diameter of the upper end convolution 67 of the second spring portion 60 such that the second spring portion 60 has a substantially cylindrical shape. The continuous wire 20 also defines a pitch between each of the plurality of helical intermediate convolutions 61, 62, 63, 64, 65, 66 of the second spring portion 60 with the pitch between each of the plurality of helical intermediate convolutions 61, 62, 63, 64, 65, 66 of the second spring portion 60 being less than the pitch between each of the plurality of helical intermediate convolutions 52, 53 of the first spring portion 50.

Turning now to the third spring portion 70 of the coil-in-coil spring 10, the third spring portion 70 includes the upper end convolution 71 and further includes three helical intermediate convolutions 72, 73, 74 that extend from the upper end convolution 71 of the third spring portion 70 to the transition convolution 51 of the first spring portion 50. Each of the plurality of helical intermediate convolutions 72, 73, 74 of the third spring portion 70 has a respective diameter with the diameter of each of the plurality of helical intermediate convolutions 72, 73, 74 progressively increasing as the plurality of helical intermediate convolutions 72, 73, 74 extends from the upper end convolution 71 of the third spring portion 70 to the transition convolution 51 of the first spring portion 50. In particular, the diameter of the first helical intermediate convolution 72 is slightly larger than the diameter of the upper end convolution 71, the diameter of the second helical intermediate convolution 73 is slightly larger than the diameter of the first helical intermediate convolution 72, and the diameter of the third helical intermediate convolution 74 is slightly larger than the diameter of the second helical intermediate convolution 73, such that the third spring portion 70 has a substantially conical shape. In the exemplary coil-in-coil spring 10 shown in FIG. 1, the diameter of the third helical intermediate convolution 74 of the third spring portion 70 is substantially the same as the diameter of the transition convolution 51 of the first spring portion 50, but, without departing from the spirit and scope of the present invention, it is contemplated that the third spring portion 70 could also be formed such that the diameter of the third helical intermediate convolution 74 of the third spring portion 70 is slightly less than the diameter of the transition convolution 51 of the first spring portion 50.

With further regard to the third spring portion 70, the continuous wire 20 again defines a pitch between each of the plurality of helical intermediate convolutions 72, 73, 74 of the third spring portion 70. Specifically, the pitch between each of the plurality of helical intermediate convolutions 72, 73, 74 of the third spring portion 70 is substantially the same, but with the pitch between each of the plurality of helical intermediate convolutions 72, 73, 74 of the third spring portion 70 being less than the pitch between each of the plurality of helical intermediate convolutions 52, 53 of the first spring portion 50 and also being less than the pitch between each of the plurality of helical intermediate convolutions 61, 62, 63, 64, 65, 66 of the second spring portion 60.

As a result of the above-described variance in the pitches and diameters along the length of the continuous wire 20, in the exemplary coil-in-coil spring 10 of FIG. 1, the first spring portion 50 has a first spring constant, the second spring portion 60 has a second spring constant greater than the first spring constant, and the third spring portion 70 has a third spring constant less than the first spring constant of the first spring portion 50 and also less than the second spring constant of the second spring portion 60. The different spring constants along with the relative positions of the first spring portion 50, the second spring portion 60, and the third spring portion 70, in turn, results in the coil-in-coil spring 10 having a variable loading response upon compression. More specifically, as the coil-in-coil spring 10 is compressed, the overall spring constant of the coil-in-coil spring 10 changes as different combinations of the first spring portion 50, the second spring portion 60, and the third spring portion 70 are engaged and begin to compress, as described in detail below.

In operation, the first spring portion 50 and the third spring portion 70 of the outer coil 30 of the coil-in-coil spring 10 function substantially as two helical springs in series, whereas the outer coil 30 and the inner coil 40 function substantially as two helical springs in parallel. As discussed above, the uncompressed height $H_{outer}$ of the outer coil 30 is greater than the uncompressed height $H_{inner}$ of the inner coil 40. As such, when a force is first applied to the coil-in-coil spring 10 only the outer coil 30 begins to compress and the coil-in-coil spring 10 therefore compresses according to the spring constant of the outer coil 30. Once the coil-in-coil spring 10 is compressed to the point where the compressed height of the outer coil 30 is equal to the uncompressed height $H_{inner}$ of the inner coil 40 (i.e., the second spring portion 60), the inner coil 40 is engaged and the coil-in-coil spring 10 compresses according to the combined spring constant of the outer coil 30 and the inner coil 40. By forming the inner coil 40 with an uncompressed height $H_{inner}$ less than the uncompressed $H_{outer}$ of the outer coil 30, the coil-in-coil spring 10 therefore exhibits at least two different loading responses.

Furthermore, and independent of the inner coil 40, as the outer coil 30 compresses, initially both the first spring portion 50 and the third spring portion 70 simultaneously compress. At some predetermined compression distance, the third spring portion 70 becomes fully compressed. That is to say, the plurality of helical intermediate convolutions 72, 73, 74 of the third spring portion 70 are unable to compress any further and the third spring portion 70 becomes deactivated. However, at the compression distance when the third spring portion 70 is deactivated, the first spring portion 50 is still capable of additional compression. Therefore, for compression distances past the point where the third spring portion 70 becomes deactivated, the outer coil 30 compresses according to the spring constant of only the first spring portion 50. As such, the outer coil 30 itself also exhibits at least two different loading responses.

Figure 2:
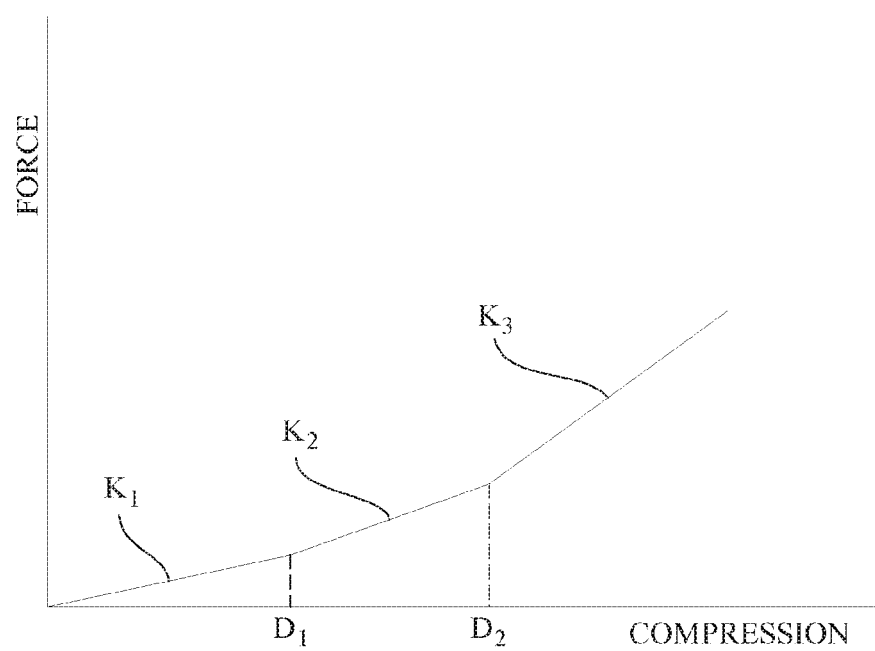
FIG. 2 is a graph depicting the forces necessary to maintain compression distances of the exemplary coil-in-coil spring of FIG. 1.

Referring now to FIG. 2, which graphically depicts the forces necessary to maintain compression distances of the exemplary coil-in-coil spring 10, the overall spring constant of the coil-in-coil spring 10 is the slope of the line at any given compression distance. As shown in the graph, the coil-in-coil spring 10 initially compresses according to a first overall spring constant $K_1$ until reaching a first compression distance $D_1$. As discussed above, during this initial compression to the first compression distance $D_1$, the second spring portion 60 (i.e., the inner coil 40) is not yet engaged, but both the first spring portion 50 and the third spring portion 70 which form the outer coil 30 simultaneously compress. As such, the first overall spring constant $K_1$ of the coil-in-coil spring 10 is based on the first spring constant of the first spring portion 50 and the third spring constant of the third spring portion 70 which form the outer coil 30.

After compressing the coil-in-coil spring 10 past the first compression distance $D_1$, further compression of the coil-in-coil spring 10 is according to a second overall spring constant $K_2$ which is greater than the first overall spring constant $K_1$. During this stage of compression, the second spring portion 60 (i.e., the inner coil 40) is engaged along with the first spring portion 50 and the third spring portion 70 which form the outer coil 30. Furthermore, the third spring portion 70 is not yet deactivated such that the both the first spring portion 50 and the third spring portion 70 of the outer coil 30 are simultaneously compressing. As such, the second overall spring constant $K_2$ of the coil-in-coil spring 10 is based on the first spring constant of the first spring portion 50, the second spring constant of the second spring portion 60, and the third spring constant of the third spring portion 70. Compression of the coil-in-coil spring 10 continues according to the second overall spring constant $K_2$ until the coil-in-coil spring reaches a second compression distance $D_2$.

Finally, after compressing the coil-in-coil spring 10 past the second compression distance $D_2$, further compression of the coil-in-coil spring 10 is according to a third overall spring constant $K_3$ which is greater than the second overall spring constant $K_2$. During this stage of compression, the second spring portion 60 (i.e., the inner coil 40) is engaged but the third spring portion 70 is deactivated such that of the outer coil 30 only the first spring portion 50 is compressing. As such, the third overall spring constant $K_3$ of the coil-in-coil spring 10 is based on the first spring constant of the first spring portion 50 and the second spring constant of the second spring portion 60. Compression of the coil-in-coil spring 10 continues according to the third overall spring constant $K_3$ until the coil-in-coil spring 10 reaches a maximum compression.

Although in the exemplary coil-in-coil spring 10 described above, the third spring portion 70 deactivates at a compression distance greater than the compression distance when the second spring portion 60 is engaged, it is understood that by changing the configuration of the first spring portion, the second spring portion, and/or the third spring portion of the coil-in-coil spring that, in some other embodiments of the present invention, the third spring portion of the coil-in-coil spring can be configured to deactivate before the second spring portion is engaged or to deactivate simultaneously with the second spring portion becoming engaged.

Furthermore, it should be understood that the above descriptions of the spring portions of the coil-in-coil are merely one exemplary embodiment of the present invention and that spring portions having, for example, different numbers of coils, coil diameters, and/or pitches can also be included in an exemplary coil-in-coil spring without departing from the spirit and scope of the present invention.

Figure 3:
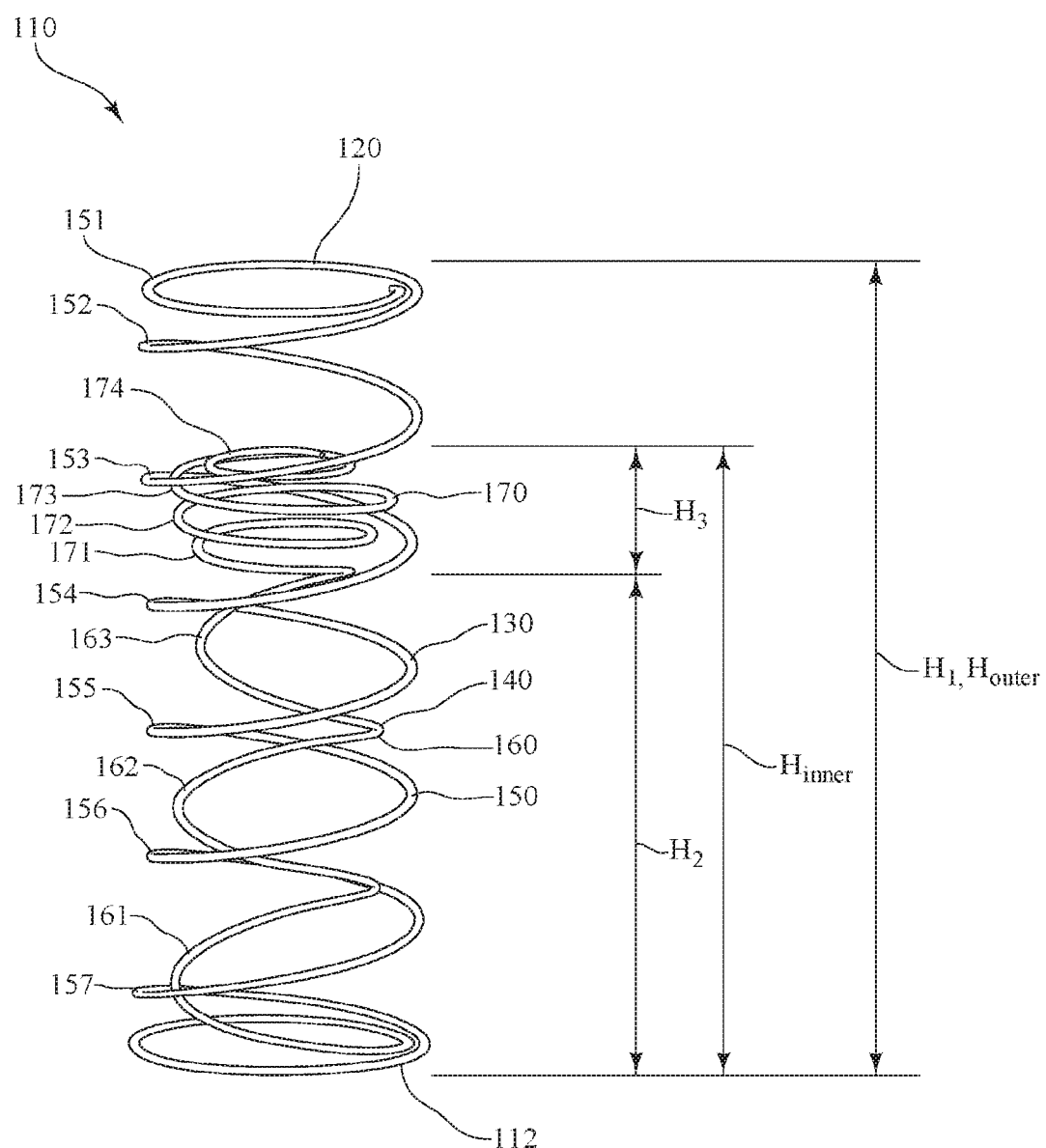
FIG. 3 is a side view of another exemplary coil-in-coil spring made in accordance with the present invention.

Referring now to FIG. 3, in another exemplary embodiment of the present invention, a coil-in-coil spring 110 is provided that also exhibits a variable loading response. Similar to the coil-in-coil spring 10 described above with reference to FIG. 1, the coil-in-coil spring 110 is also comprised of a continuous wire 120 forming an outer coil 130 and an inner coil 140, which is positioned within the outer coil 130. The continuous wire 120 also forms a first spring portion 150, a second spring portion 160, and a third spring portion 170, which collectively form the outer coil 130 and the inner coil 140 of the coil-in-coil spring 110. However, in the coil-in-coil spring 110 shown in FIG. 3, the second spring portion 160 and the third spring portion 170 are both positioned within the first spring portion 150, with the third spring portion 170 being positioned above the second spring portion 160. As such, the second spring portion 160 and the third spring portion 170 collectively form the inner coil 140 of the coil-in-coil spring 110 and the first spring portion 150 forms the outer coil 130 of the coil-in-coil spring 110.

Furthermore, in the coil-in-coil spring 110, the first spring portion 150 has an uncompressed height $H_1$, the second spring portion 160 has an uncompressed height $H_2$, and the third spring portion 170 has an uncompressed height $H_3$. As shown in FIG. 3, the outer coil 130 has an uncompressed height $H_{outer}$, which is essentially the uncompressed height $H_1$ of the first spring portion 150, and which is greater than the uncompressed height $H_{inner}$ of the inner coil 140, which is substantially the same as the uncompressed height $H_2$ of the second spring portion 160 plus the uncompressed height $H_3$ of the third spring portion 170. In particular, in the coil-in-coil spring 110, the uncompressed height $H_1$ of the first spring portion 150 is about 225 mm, the uncompressed height $H_2$ of the second spring portion 160 is about 133 mm, and the uncompressed height $H_3$ of the third spring portion 170 is about 42 mm. Furthermore, in the coil-in-coil spring 110, the first spring portion 150 has a diameter of about 82 mm, while the second spring portion 160 has a diameter of about 55 mm. Again though, the foregoing dimensions are but one example, and numerous other exemplary coil-in-coil springs having similar arrangements, but including alternative dimensions can also be produced without departing from the spirit and scope of the present invention.

Of note, and similar to the coil-in-coil spring 10 described above with reference to FIG. 1, a lower end 112 of the coil-in-coil spring 110 forms a substantially planar loop at the lowermost portion of the coil-in-coil spring 110. In the coil-in-coil spring 110, however, the first spring portion 150 includes an upper end convolution 151, which forms a substantially planar loop at the topmost portion of the coil-in-coil spring 110. In this way though, and like the coil-in-coil spring 10 described above with reference to FIG. 1, the coil-in-coil spring 110 shown in FIG. 3 still terminates at either end in generally planar forms, which serve as the supporting end structures of the coil-in-coil spring 110.

Referring still to FIG. 3, and with further respect to the first spring portion 150, the second spring portion 160, and the third spring portion 170 of the coil-in-coil spring 110, the first spring portion 150 includes an upper end convolution 151, and further includes six helical intermediate convolutions 152, 153, 154, 155, 156, 157, which extend from the upper end convolution 151 to the lower end 112 of the coil-in-coil spring 110. Each of the plurality of helical intermediate convolutions 152, 153, 154, 155, 156, 157 of the first spring portion 150 has a respective diameter, which are substantially the same and are substantially equal to the diameter of the upper end convolution 151 of the first spring portion 150, as well as to the diameter of the lower end 112 of the coil-in-coil spring 110, such that the first spring portion 150 formed by the continuous wire 120 has a substantially cylindrical shape. The continuous wire 120 also defines a pitch between each of the plurality of helical intermediate convolutions 152, 153, 154, 155, 156, 157 of the first spring portion 150 with the pitch between each of the plurality of helical intermediate convolutions 152, 153, 154, 155, 156, 157 of the first spring portion 150 being substantially the same.

Turning now to the second spring portion 160 of the coil-in-coil spring 110, the second spring portion 160 includes a transition convolution 163 and two helical intermediate convolutions 161, 162 extending from the lower end 112 of the coil-in-coil spring 110 to the transition convolution 163. Each of the plurality of helical intermediate convolutions 161, 162 of the second spring portion 160 has a respective diameter, which are substantially the same and are substantially equal to the diameter of the transition convolution 163 of the second spring portion 160, such that the second spring portion 160 also has a substantially cylindrical shape. In this regard, the continuous wire 120 defines a pitch between each of the plurality of helical intermediate convolutions 161, 162 of the second spring portion 160, with each of the pitches being substantially the same, and with each pitch being less than the pitch between each of the plurality of helical intermediate convolutions 152, 153, 154, 155, 156, 157 of the first spring portion 150.

Turning now to the third spring portion 170 of the coil-in-coil spring 110, the third spring portion 170 includes an upper end convolution 174 and three helical intermediate convolutions 171, 172, 173 that extend from the transition convolution 163 of the second spring portion 160 to the upper end convolution 174 of the third spring portion 170. Each of the plurality of helical intermediate convolutions 171, 172, 173 of the third spring portion 170 has a respective diameter with the diameter of each of the plurality of helical intermediate convolutions 171, 172, 173 progressively increasing as the plurality of helical intermediate convolutions 171, 172, 173 extend from the transition convolution 163 of the second spring portion 160 to the upper end convolution 174 of the third spring portion 170. In particular, the diameter of the second helical intermediate convolution 172 is slightly larger than the diameter of the first helical intermediate convolution 171 and the diameter of the third helical intermediate convolution 173 is slightly larger than the diameter of the second helical intermediate convolution 172, such that the third spring portion 170 has an inverted conical shape. In the exemplary coil-in-coil spring 110 shown in FIG. 3, the diameter of the upper end convolution 174 of the third spring portion 170 is slightly smaller than the diameter of the third helical intermediate convolution 173 of the third spring portion 170, but, without departing from the spirit and scope of the present invention, it is contemplated that the third spring portion 170 could also be formed such that the diameter of the upper end convolution 174 of the third spring portion 170 is substantially the same as the diameter of the third helical intermediate convolution 173 of the third spring portion 170 or slightly larger than the diameter of the third helical intermediate convolution 173 of the third spring portion 170.

With further regard to the third spring portion 170, the continuous wire 120 also defines a pitch between each of the plurality of helical intermediate convolutions 171, 172, 173 of the third spring portion 170. Specifically, the pitch between each of the plurality of helical intermediate convolutions 171, 172, 173 of the third spring portion 170 is substantially the same, with the pitch between each of the plurality of helical intermediate convolutions 171, 172, 173 of the third spring portion 170 being less than the pitch between each of the plurality of helical intermediate convolutions 152, 153, 154, 155, 156, 157 of the first spring portion 150 and also being less than the pitch between each of the plurality of helical intermediate convolutions 161, 162 of the second spring portion 160.

Similar to the coil-in-coil spring 10 described above with reference to FIG. 1, in the coil-in-coil spring 110 of FIG. 3, the first spring portion 150 thus has a first spring constant, the second spring portion 160 has a second spring constant greater than the first spring constant, and the third spring portion 170 has a third spring constant, which is less than the first spring constant of the first spring portion 150 and is also greater than the second spring constant of the second spring portion 160. In this regard, the different spring constants along with the relative positions of the first spring portion 150, the second spring portion 160, and the third spring portion 170 again results in the overall spring constant of the coil-in-coil spring 110 changing during compression, as different combinations of the first spring portion 150, the second spring portion 160, and the third spring portion 170 are engaged and begin to compress, as discussed below.

In operation, in the coil-in-coil spring 110, the second spring portion 160 and the third spring portion 170 of the inner coil 140 of the coil-in-coil spring 110 function substantially as two helical springs in series, whereas the outer coil 130 and the inner coil 140 function substantially as two helical springs in parallel. As discussed above, the uncompressed height $H_{outer}$ of the outer coil 130 is greater than the uncompressed height $H_{inner}$ of the inner coil 140. As such, when a force is first applied to the coil-in-coil spring 110 only the outer coil 130 (i.e., the first spring portion 150) compresses and the coil-in-coil spring 110 compresses according to the spring constant of the outer coil 130. During this initial compression, the first overall spring constant $K_1$ of the coil-in-coil spring 110 is based only on the first spring constant of the first spring portion 150.

Once the coil-in-coil spring 110 is then compressed to the point where the compressed height of the outer coil 130 is equal to the uncompressed height $H_{inner}$ of the inner coil 140 (i.e., the uncompressed height $H_2$ of the second spring portion 160 plus the uncompressed height $H_3$ of the third spring portion 170), the inner coil 140 is engaged and the coil-in-coil spring 110 compresses according to the combined spring constant of the outer coil 130 and the inner coil 140. During this stage of compression, the second spring portion 160 and the third spring portion 170, which form the inner coil 140, are both engaged such that the both the second spring portion 160 and the third spring portion 170 of the inner coil 140 are simultaneously compressing. As such, the second overall spring constant $K_2$ of the coil-in-coil spring 110 is based on the first spring constant of the first spring portion 150, the second spring constant of the second spring portion 160, and the third spring constant of the third spring portion 170.

Upon further compression and at a predetermined compression distance, the third spring portion 170 then becomes fully compressed and is deactivated, while the second spring portion 160 is still capable of additional compression. After the third spring portion 170 becomes deactivated, the inner coil 140 then compresses according to the spring constant of only the second spring portion 160. As such, the third overall spring constant $K_3$ of the coil-in-coil spring 110 is based on the first spring constant of the first spring portion 150 and the second spring constant of the second spring portion 160. Compression of the coil-in-coil spring 110 subsequently continues according to the third overall spring constant $K_3$ until the coil-in-coil spring 110 reaches a maximum compression. In other words, the coil-in-coil spring 110 shown in FIG. 3 therefore has a spring constant that increases as the coil-in-coil spring 110 compresses to provide an increasing level of support in response to additional loading.

Figure 4:
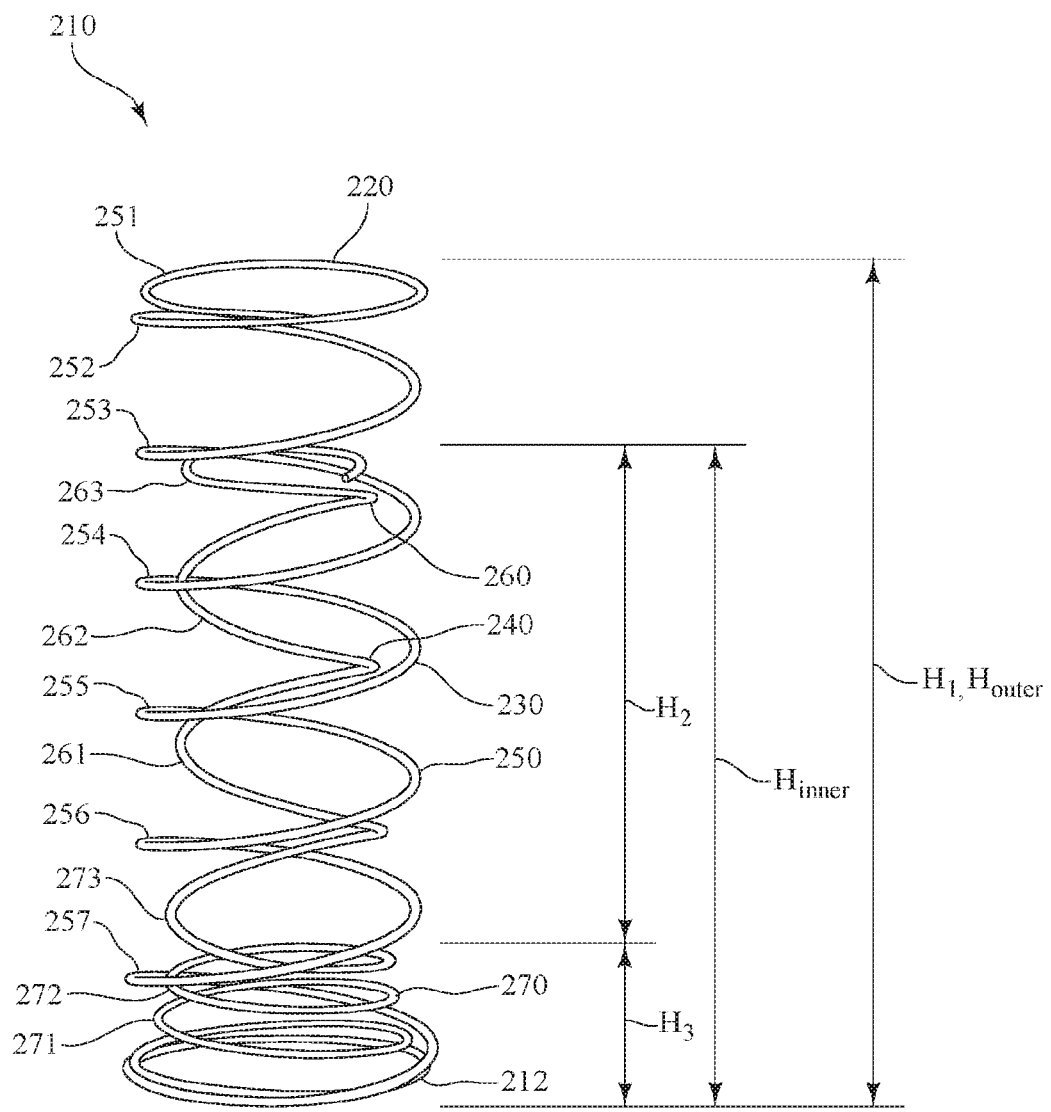
FIG. 4 is a side view of another exemplary coil-in-coil spring made in accordance with the present invention.

As a further refinement to the exemplary coil-in-coil spring of the present invention, in some embodiments, the third spring portion can also be positioned below the second spring portion rather than above the second spring portion. Referring now to FIG. 4, in another exemplary embodiment of the present invention, and similar to the coil-in-coil spring 110 shown in FIG. 3, a coil-in-coil spring 210 is provided that is comprised of a continuous wire 220 forming an outer coil 230 and an inner coil 240, which is positioned within the outer coil 230. The continuous wire 220 also forms a first spring portion 250, a second spring portion 260, and a third spring portion 270, which collectively form the outer coil 230 and the inner coil 240 of the coil-in-coil spring 210. Furthermore, the second spring portion 260 and the third spring portion 270 are also both positioned within the first spring portion 250, such that the second spring portion 260 and the third spring portion 270 form the inner coil 240 of the coil-in-coil spring 210 and the first spring portion 250 forms the outer coil 230 of the coil-in-coil spring 210. Also like the coil-in-coil spring 110 shown in FIG. 3, in the coil-in-coil spring 210 of FIG. 4, the first spring portion 250 has an uncompressed height $H_1$, the second spring portion 260 has an uncompressed height $H_2$, and the third spring portion 270 has an uncompressed height $H_3$. Likewise, the outer coil 230 has an uncompressed height $H_{outer}$, which is equal to the uncompressed height of the first spring portion 250 and is greater than the uncompressed height of the inner coil 240, $H_{inner}$, which, in turn, is substantially equal to the uncompressed height $H_2$ of the second spring portion 260 plus the uncompressed height $H_3$ of the third spring portion 270. Similarly, in the coil-in-coil spring 210, the uncompressed height $H_1$ of the first spring portion 250 is about 225 mm, the uncompressed height $H_2$ of the second spring portion 260 is about 133 mm, and the uncompressed height $H_3$ of the third spring portion 270 is about 42 mm. Once again though, the foregoing dimensions are but one example, and numerous other exemplary coil-in-coil springs having similar arrangements to that shown in FIG. 4, but including alternative dimensions can further be produced without departing from the spirit and scope of the present invention.

Referring still to FIG. 4, the first spring portion 250 of the coil-in-coil spring 210 of FIG. 4 is also substantially identical to the first spring portion 150 described above with reference to FIG. 3, and includes an upper end convolution 251 and six helical intermediate convolutions 252, 253, 254, 255, 256, 257 extending from the upper end convolution 251 to a lower end 212 of the coil-in-coil spring 210. That is to say, each of the plurality of helical intermediate convolutions 252, 253, 254, 255, 256, 257 of the first spring portion 250 has a respective diameter that are substantially the same (e.g., about 82 mm), and each pitch between the plurality of helical intermediate convolutions 252, 253, 254, 255, 256, 257 is substantially the same as well.

Unlike the coil-in-coil spring 110 shown in FIG. 3, however, the third spring portion 270 is not positioned above the second spring portion 260. Rather, in the coil-in-coil spring shown in FIG. 4, the third spring portion 270 is positioned below the second spring portion 260, and includes a transition convolution 273 and two helical intermediate convolutions 271, 272 that extend from the lower end 212 of the coil-in-coil spring 210 to the transition convolution 273. Each of the plurality of helical intermediate convolutions 271, 272 of the third spring portion 270 has a respective diameter with the diameter of each of the plurality of helical intermediate convolutions 271, 272 progressively decreasing as the plurality of helical intermediate convolutions 271, 272 extend from the lower end 212 of the coil-in-coil spring 210 to the transition convolution 273. In particular, the diameter of the first helical intermediate convolution 271 is slightly smaller than the lower end 212 of the coil-in-coil spring 210, the diameter of the second helical intermediate convolution 272 is slightly smaller than the diameter of the first helical intermediate convolution 271, and the diameter of the transition convolution 273 is slightly smaller than the diameter of the second helical intermediate convolution 272, such that the continuous wire 220 forming the third spring portion 270 has a substantially conical shape. The continuous wire 220 also defines a pitch between each of the plurality of helical intermediate convolutions 271, 272 of the third spring portion 270, with the pitch between each of the plurality of helical intermediate convolutions 271, 272 of the third spring portion 270 being substantially the same and being less than the pitch between each of the plurality of helical intermediate convolutions 252, 253, 254, 255, 256, 257 of the first spring portion 250.

Turning now to the second spring portion 260 of the coil-in-coil spring 210, the second spring portion 260 then includes an upper end convolution 263 and two of helical intermediate convolutions 261, 262 that extend from the transition convolution 273 of the third spring portion 270 to the upper end convolution 263 of the second spring portion 260. Each of the plurality of helical intermediate convolutions 261, 262 of the second spring portion 260 has a respective diameter (e.g., about 37 mm), which are substantially the same and are substantially equal to the diameter of the transition convolution 273 of the third spring portion 270, such that the continuous wire 220 forming the second spring portion 260 has a substantially cylindrical shape. The continuous wire 220 further defines a pitch between each of the plurality of helical intermediate convolutions 261-262 of the second spring portion 260. Specifically, the pitch between each of the plurality of helical intermediate convolutions 261, 262 of the second spring portion 260 is substantially the same, but with the pitch between each of the plurality of helical intermediate convolutions 261, 262 of the second spring portion 260 being less than the pitch between each of the plurality of helical intermediate convolutions 252, 253, 254, 255, 256, 257 of the first spring portion 250 and greater than the pitch between each of the plurality of helical intermediate convolutions 271, 272 of the third spring portion 270. For example, in the coil-in-coil spring 210, the pitch between each of the plurality of helical intermediate convolutions 252, 253, 254, 255, 256, 257 of the first spring portion 250 is typically about 61 mm, while the pitch between the plurality of helical intermediate convolutions 261, 262 of the second spring portion 260 is about 14-15 mm and the pitch between each of the plurality of helical intermediate convolutions 271, 272 of the third spring portion 270 is about 10 mm to about 12 mm.

Similar to the coil-in-coil springs 10, 110 described above with reference to FIGS. 1 and 3, in the coil-in-coil spring 210 of FIG. 4, the first spring portion 250 has a first spring constant, the second spring portion 260 has a second spring constant greater than the first spring constant, and the third spring portion 270 has a third spring constant greater than the first spring constant of the first spring portion 250 and also less than the second spring constant of the second spring portion 260. The different spring constants along with the relative positions of the first spring portion 250, the second spring portion 260, and the third spring portion 270 results in the overall spring constant of the coil-in-coil spring 210 changing during compression as different combinations of the first spring portion 250, the second spring portion 260, and the third spring portion 270 are engaged and begin to compress as discussed below.

The coil-in-coil spring 210 shown in FIG. 4 operates in substantially the same manner as the coil-in-coil spring 110 shown in FIG. 3, with a first overall spring constant $K_1$ of the coil-in-coil spring 210 being based only on the first spring constant of the first spring portion 250, a second overall spring constant $K_2$ of the coil-in-coil spring 210 being based on the first spring constant of the first spring portion 250, the second spring constant of the second spring portion 260, and the third spring constant of the third spring portion 270, and a third overall spring constant $K_3$ of the coil-in-coil spring 210 being based on the first spring constant of the first spring portion 250 and the second spring constant of the second spring portion 260 due to the third spring portion 270 becoming fully compressed and deactivated after being compressed a predetermined distance. The coil-in-coil spring 210 shown in FIG. 4 therefore has a spring constant which increases as the coil-in-coil spring 210 compresses to provide an increasing level of support in response to additional loading.

Figure 5:
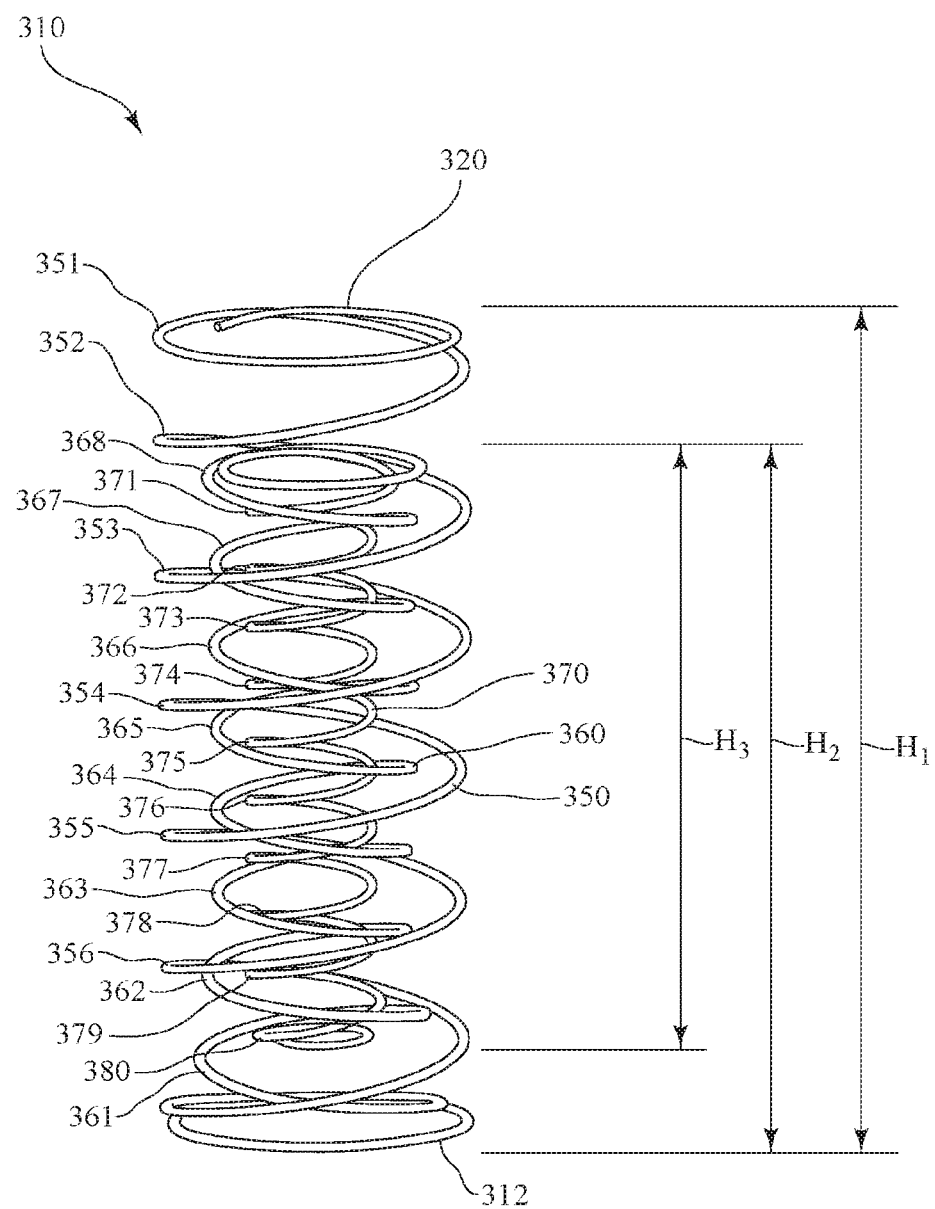
FIG. 5 is a side view of another exemplary coil-in-coil spring made in accordance with the present invention.

As yet another refinement to the present invention, in addition to varying the arrangement of portions of a coil-in-coil spring to provide a variable loading response, additional intermediate coils can also be positioned between the inner coil and the outer coil to provide variation in a loading response. Referring now to FIG. 5, in another exemplary embodiment of the present invention, a multi-coil spring 310 is provided that is comprised of a continuous wire 320 forming an outer coil 350, an intermediate coil 360 positioned within the outer coil 350, and an inner coil 370 positioned within the intermediate coil 360 with the outer coil 350, the intermediate coil 360, and the inner coil 370 all formed of a plurality of convolutions of the continuous wire 320 and having various uncompressed heights. In particular, the outer coil 350 has an uncompressed height $H_1$, the intermediate coil 360 has an uncompressed height $H_2$ that is less than the uncompressed height $H_1$ of the outer coil 350, and the inner coil 370 has an uncompressed height $H_3$ that is less than the uncompressed height $H_2$ of the intermediate coil 360. More specifically, in the coil-in-coil spring 310, the uncompressed height $H_1$ of the outer coil 350 is about 226 mm, the uncompressed height $H_2$ of the intermediate coil 360 is about 133 mm, and the uncompressed height $H_3$ of the inner coil 370 is about 42 mm. Again though, the foregoing dimensions are but one example, and numerous other exemplary coil-in-coil springs having similar arrangements, but including alternative dimensions can also be produced without departing from the spirit and scope of the present invention.

Referring still to FIG. 5, the outer coil 350 of the multi-coil spring 310 includes an upper end convolution 351 and a plurality of helical intermediate convolutions 352, 353, 354, 355, 356 that extend from the upper end convolution 351 of the outer coil 350 to a lower end 312 of the multi-coil spring 310. Each of the plurality of helical intermediate convolutions 352, 353, 354, 355, 356 of the outer coil 350 has a respective diameter (e.g., about 82 mm), which are substantially the same and are substantially equal to the diameter of the upper end convolution 351 of the outer coil 350 as well as to the diameter of the lower end 312 of the multi-coil spring 310, such that the continuous wire 320 forming the outer coil 350 has a substantially cylindrical shape. The continuous wire 320 also defines a pitch between each of the plurality of helical intermediate convolutions 352, 353, 354, 355, 356 of the outer coil 350, with the pitch between each of the plurality of helical intermediate convolutions 352, 353, 354, 355, 356 of the outer coil 350 being substantially the same.

The intermediate coil 360 includes an upper end convolution 368 and a plurality of helical intermediate convolutions 361, 362, 363, 364, 365, 366, 367 that extend from the lower end 312 of the multi-coil spring 310 to the upper end convolution 368 of the intermediate coil 360. Each of the plurality of helical intermediate convolutions 361, 362, 363, 364, 365, 366, 367 of the intermediate coil 360 has a respective diameter (e.g. about 55 mm), which are all substantially the same and are substantially equal to the diameter of the upper end convolution 368 of the intermediate coil 360, such that the continuous wire 320 forming the intermediate coil 360 has a substantially cylindrical shape. Furthermore, the diameter of each the plurality of helical intermediate convolutions 361, 362, 363, 364, 365, 366, 367 and the upper end convolution 368 of the intermediate coil 360 is less than the diameter each of the convolutions of the outer coil 350, such that the intermediate coil 360 does not contact the outer coil 350 when the multi-coil spring 310 is compressed. The continuous wire 320 also defines a pitch between each of the plurality of helical intermediate convolutions 361, 362, 363, 364, 365, 366, 367 of the intermediate coil 360. Specifically, the pitch between each of the plurality of helical intermediate convolutions 361, 362, 363, 364, 365, 366, 367 of the intermediate coil 360 is substantially the same and is less than the pitch between each of the plurality of helical intermediate convolutions 352, 353, 354, 355, 356 of the outer coil 350.

Turning now to the inner coil 370, the inner coil 370 includes a lower end convolution 380 and a plurality of helical intermediate convolutions 371, 372, 373, 374, 375, 376, 377, 378, 379 that extend from the upper end convolution 368 of the intermediate coil 360 to the lower end convolution 380 of the inner coil 370. Each of the plurality of helical intermediate convolutions 371, 372, 373, 374, 375, 376, 377, 378, 379 of the inner coil 370 has a respective diameter (e.g., about 35 mm), which are all substantially the same and are substantially equal to the diameter of the lower end convolution 380 of the inner coil 370, such that the continuous wire 320 forming inner coil 370 also has a substantially cylindrical shape. However, the diameter of each the plurality of helical intermediate convolutions 371, 372, 373, 374, 375, 376, 377, 378, 379 and the lower end convolution 380 of the inner coil 370 is less than the diameter each of the convolutions of the intermediate coil 360, such that the inner coil 370 does not contact the intermediate coil 360 when the multi-coil spring 310 is compressed. The continuous wire 320 also defines a pitch between each of the plurality of helical intermediate convolutions 371, 372, 373, 374, 375, 376, 377, 378, 379 of the inner coil 370, with the pitch between each of the plurality of helical intermediate convolutions 371, 372, 373, 374, 375, 376, 377, 378, 379 of the inner coil 370 being substantially the same and being less than the pitch between each of the plurality of helical intermediate convolutions 361, 362, 363, 364, 365, 366, 367 of the intermediate coil 360.

In operation, the outer coil 350, the intermediate coil 360, and the inner coil 370 function substantially as three helical springs in parallel. As discussed above, the uncompressed height $H_2$ of the intermediate coil 360 is less than the uncompressed height $H_1$ of the outer coil 350 and the uncompressed height $H_3$ of the inner coil 370 is less than the uncompressed height $H_2$ of the intermediate coil 360. As such, when a force is first applied to the multi-coil spring 310, only the outer coil 350 is engaged and compresses so that the first overall spring constant $K_1$ of the multi-coil spring 310 is based only on the spring constant of the outer coil 350. Once the multi-coil spring 310 is compressed to the point where the compressed height of the outer coil 350 is equal to the uncompressed height $H_2$ of the intermediate coil 360, the intermediate coil 360 is then engaged and begins to compress along with the outer coil 350 so that the second overall spring constant $K_2$ of the multi-coil spring 310 is based on the spring constant of the outer coil 350 and the spring constant of the intermediate coil 360. Application of further force to the multi-coil spring 310 subsequently results in compression of both the outer coil 350 and the intermediate coil 360, but the inner coil 370 remains unengaged. Once the multi-coil spring 310 is compressed to the point where the compressed height of the outer coil 350 and the compressed height of the intermediate coil 360 is equal to the uncompressed height $H_3$ of the inner coil 370, however, the inner coil 370 is engaged and begins to compress along with the outer coil 350 and the intermediate coil 360 so that the third overall spring constant $K_3$ of the multi-coil spring 310 is based on the spring constant of the outer coil 350, the spring constant of the intermediate coil 360, and the spring constant of the inner coil 370. The multi-coil spring 310 shown in FIG. 5 therefore has a spring constant that also increases as the multi-coil spring 310 compresses to provide an increasing level of support in response to additional loading.

Regardless of the particular configuration of the exemplary coil-in-coil springs or multi-coil springs, in some embodiments of the present invention, each of the coil-in-coil springs, can further be included in a mattress to provide a user with the non-linear support typically seen in a foam mattress, but through the use of coil-in-coil or multi-coil springs. For example, and referring now to FIG. 6, in another embodiment of the present invention, a mattress 500 is provided that includes a plurality of the coil-in-coil springs 10 described above with reference to FIG. 1. Each of the plurality of coil-in-coil springs 10 is encased in a flexible enclosure 590 to form a plurality of pocketed coil-in-coil springs 520. In this regard, each flexible enclosure 590 includes a bottom wall 592, a top wall 596, and a continuous side wall 594 that extends from the bottom wall 592 to the top wall 596 and that surrounds each coil-in-coil spring 10.

Each of the pocketed coil-in-coil springs 520 included in the mattress 500 are arranged in a matrix. The mattress 500 also comprises an upper body supporting layer 503 positioned above the pocketed coil-in-coil springs 520 and a lower foundation layer 504 positioned below the pocketed coil-in-coil springs 520. A sidewall 505 extends between the upper body supporting layer 503 and the lower foundation layer 504 around the entire periphery of the two layers 503, 504, such that the matrix of pocketed coil-in-coil springs 520 is completely surrounded.

Figure 6:
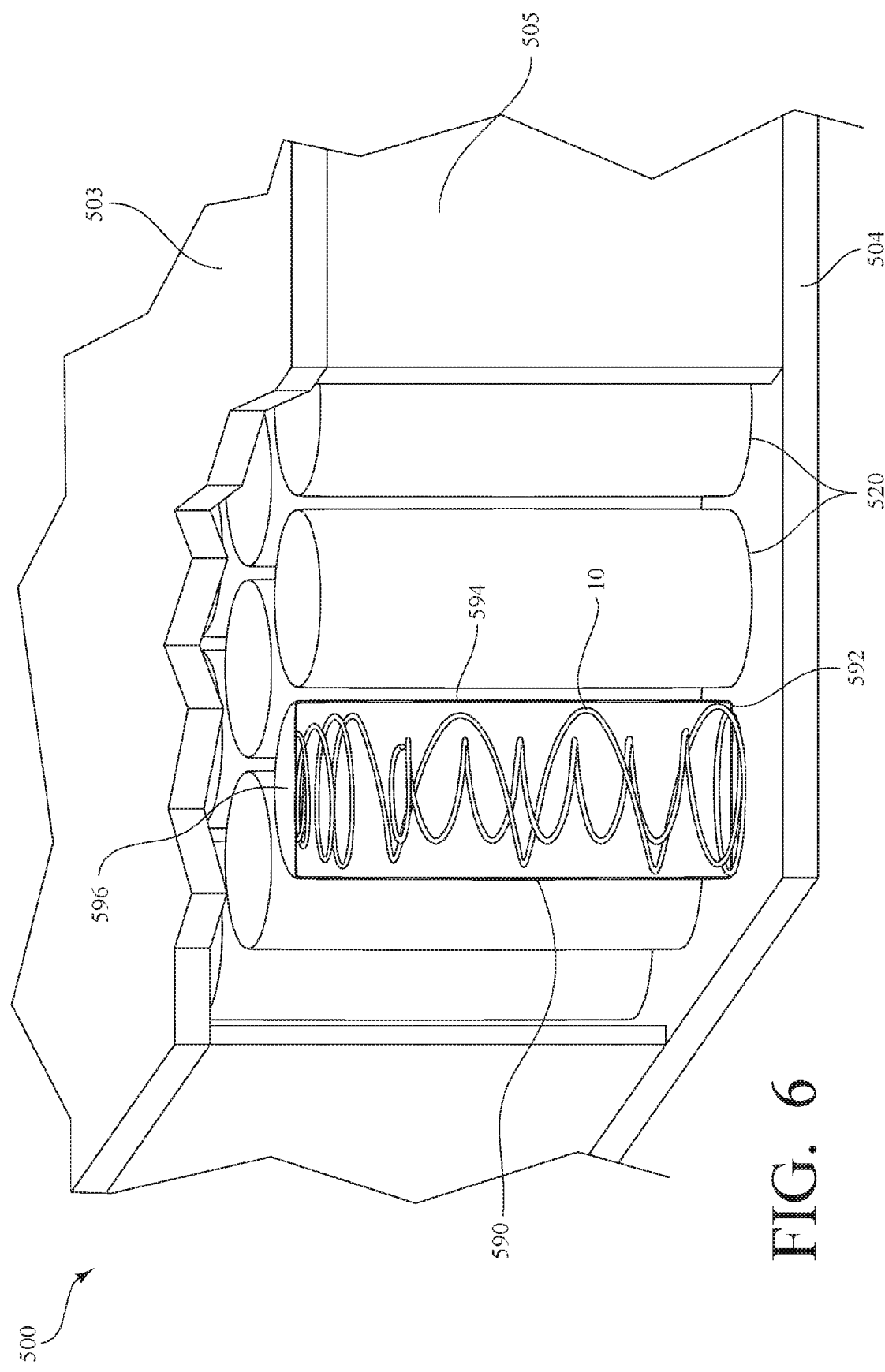
FIG. 6 is a cross-sectional view of an exemplary mattress made in accordance with the present invention, and showing a plurality of the coil-in-coil springs of FIG. 1 arranged in a matrix and enclosed within fabric pockets.

In the mattress 500 shown in FIG. 6, the upper body supporting layer 503 and the sidewall 505 of the mattress 500 are each comprised of a visco-elastic foam to support the body of a user and provide a sufficiently soft surface on which to rest. The lower foundation layer 504, on the other hand, is typically comprised of a piece of wood or other similarly rigid material capable of supporting the matrix of pocketed coil-in-coil springs 520. However, it is of course contemplated that the upper body supporting layer 503 and the sidewall 505 of the mattress 500, as well as the lower foundation layer 504, can also be comprised of other materials or combinations of materials known to those skilled in the art, including, but not limited to foam, upholstery, and/or other flexible materials.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A coil-in-coil spring, comprising:
   a continuous wire including:
      a first spring portion having a first spring constant and forming an outer coil of the coil-in-coil spring, said first spring portion having a height, said first spring portion including an upper end convolution and a first plurality of helical intermediate convolutions extending from a lower end of the intermediate convolutions to the upper end convolution;
      a second spring portion having a second spring constant greater than said first spring constant, the second spring portion having a height less than the height of the outer coil, said second spring portion being positioned within said first spring portion and forming an inner coil, said second spring portion including an upper end convolution and a second plurality of helical intermediate convolutions extending from a lower end of the second spring portion to the upper end convolution of the second spring portion; and,
      a third spring portion having a conical shape and third spring constant which varies, said third spring portion being less than said second spring portion, the third spring portion being positioned in either:
         at an upper end of said second spring portion and within said first spring portion or, at an upper end of said first spring portion;
      the third spring portion having a transition convolution and a third plurality of convolutions of differing diameter;
      wherein each of said first spring portion, said second spring portion and said third spring portion are of different diameters and different spring constants;
      wherein the third plurality of convolutions is less than the first plurality of helical intermediate convolutions and is less than the second plurality of helical intermediate convolutions, and said third spring portion deactivating during compression of the coil-in-coil spring so that said first spring portion, or both said first and second spring portions remain active.

2. The coil-in-coil spring of claim 1, wherein the continuous wire is encased in a flexible enclosure to form a plurality of pocketed coil-in-coil springs.

3. The coil-in-coil spring of claim 2, wherein the third spring portion is positioned above the first spring portion.

4. The coil-in-coil spring of claim 3, wherein the first spring portion includes a transition convolution and a plurality of helical intermediate convolutions extending from the transition convolution to a lower end of the coil-in-coil spring; and
   wherein the third spring portion includes an upper end convolution and the plurality of helical intermediate convolutions extending from the upper end convolution of the third spring portion to the transition convolution of the first spring portion, each of the plurality of helical intermediate convolutions of the third spring portion being of differing diameters and having a respective diameter, the diameter of each of the plurality of helical intermediate convolutions of the third spring portion progressively increasing as the plurality of helical intermediate convolutions of the third spring portion extends from the upper end convolution of the third spring portion to the transition convolution of the first spring portion.

5. The coil-in-coil spring of claim 4, wherein each of the plurality of helical intermediate convolutions of the first spring portion has a respective diameter, the diameter of each of the plurality of helical intermediate convolutions of the first spring portion being substantially the same.

6. The coil-in-coil spring of claim 4, wherein the second spring portion includes an upper end convolution and the plurality of helical intermediate convolutions extending from the lower end of the second spring portion to the upper end convolution of the second spring portion, each of the plurality of helical intermediate convolutions of the second spring portion having a respective diameter, the diameter of each of the plurality of helical intermediate convolutions of the second spring portion being substantially the same.

7. The coil-in-coil spring of claim 6, wherein the continuous wire defines a pitch between each of the plurality of helical intermediate convolutions in the first spring portion, a pitch between each of the plurality of helical intermediate convolutions in the second spring portion, and a pitch between each of the plurality of helical intermediate convolutions in the third spring portion;
   wherein the pitch between each of the plurality of helical intermediate convolutions in the second spring portion is less than the pitch between each of the plurality of helical intermediate convolutions in the first spring portion; and
   wherein the pitch between each of the plurality of helical intermediate convolutions in the third spring portion is less than the pitch between each of the plurality of helical intermediate convolutions in the second spring portion.

8. The coil-in-coil spring of claim 2, wherein the second spring portion and the third spring portion are both positioned within the first spring portion and both form an inner coil of the coil-in-coil spring.

9. The coil-in-coil spring of claim 8, wherein the second spring portion includes a transition convolution and a plurality of helical intermediate convolutions extending from a lower end of the coil-in-coil spring to the transition convolution, each of the plurality of helical intermediate convolutions of the second spring portion having respective diameter, the diameter of each of the plurality of helical intermediate convolutions of the second spring portion being substantially the same.

10. The coil-in-coil spring of claim 9, wherein said third spring portion includes an upper end convolution and a plurality of helical intermediate convolutions extending from the transition convolution to the upper end convolution of the third spring portion, each of the plurality of helical intermediate convolutions of the third spring portion having a respective diameter, the diameter of each of the plurality of helical intermediate convolutions of the third spring portion progressively increasing in one direction.

11. The coil-in-coil spring of claim 2, said third spring portion being a conical shape.

12. A coil-in-coil spring, comprising:
    a continuous wire including:
        a first spring portion having a first spring constant and forming an outer coil of the coil-in-coil spring, said first spring portion having a height, said first spring portion including an upper end convolution and a first plurality of helical intermediate convolutions extending from a lower end of the intermediate convolutions to the upper end convolution;
        a second spring portion having a second spring constant greater than said first spring constant, the second spring portion having a height less than the height of the outer coil and forming an inner coil, said second spring portion including an upper end convolution and a second plurality of helical intermediate convolutions extending from a lower end of the second spring portion to the upper end convolution of the second spring portion; and
        a third spring portion having a conical shape and a third spring constant which varies and is less than said second spring portion, the third spring portion being positioned above the second spring portion and both said second spring portion and said third spring portion disposed within said first spring portion;
        the third spring portion having a transition convolution and at least two convolutions of differing diameter defining a substantially conical shape;
    wherein each of said first spring portion, said second spring portion and said third spring portion are of different diameters and different spring constants;
    wherein the at least two convolutions is less than the first plurality of helical intermediate convolutions and is less than the second plurality of helical intermediate convolutions, and said third spring portion deactivates during compression of the coil-in-coil spring so that said first spring portion or both said first and second spring portion remain active.

13. The coil-in-coil spring of claim 12, wherein the outer coil includes the upper end convolution and the first plurality of helical intermediate convolutions extending from the upper end convolution of the outer coil to a lower end of the coil-in-coil spring;
    wherein the second spring portion includes the upper end convolution and the second plurality of helical intermediate convolutions extending from the lower end of the coil-in-coil spring to the upper end convolution of the second spring portion; and
    wherein the third spring portion includes a lower end convolution and a plurality of helical intermediate convolutions extending from the upper end convolution of the second spring portion to the upper end convolution of the third spring portion.

14. The coil-in-coil spring of claim 13, wherein the continuous wire defines a pitch between each of the plurality of helical intermediate convolutions in the outer coil, a pitch between each of the plurality of helical intermediate convolutions in the second spring portion, and a pitch between each of the plurality of helical intermediate convolutions in the third spring portion;
    wherein the pitch between each of the plurality of helical intermediate convolutions in the second spring portion is less than the pitch between each of the plurality of helical intermediate convolutions in the outer coil; and
    wherein the pitch between each of the plurality of helical intermediate convolutions in the third spring portion is less than the pitch between each of the plurality of helical intermediate convolutions in the second spring portion.

* * * * *